United States Patent
Park et al.

(10) Patent No.: US 10,446,098 B2
(45) Date of Patent: Oct. 15, 2019

(54) DISPLAY DEVICE AND METHOD FOR DRIVING THE SAME

(71) Applicant: SAMSUNG DISPLAY CO., LTD., Yongin-si, Gyeonggi-do (KR)

(72) Inventors: Jaebyung Park, Seoul (KR); Hyundeok Im, Seoul (KR); Hyunmin Cho, Seoul (KR); Jonghyuk Kang, Suwon-si (KR); Suksun Lee, Yongin-si (KR); Jaewoong Kang, Jeonju-si (KR); Sungjin Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 627 days.

(21) Appl. No.: 15/098,612

(22) Filed: Apr. 14, 2016

(65) Prior Publication Data
US 2016/0351144 A1    Dec. 1, 2016

(30) Foreign Application Priority Data

May 29, 2015    (KR) .......................... 10-2015-0076029

(51) Int. Cl.
*G09G 3/36* (2006.01)
*G02F 1/1335* (2006.01)

(52) U.S. Cl.
CPC ..... *G09G 3/3648* (2013.01); *G02F 1/133514* (2013.01); *G02F 1/133617* (2013.01); *G02F 2001/133622* (2013.01); *G02F 2202/36* (2013.01); *G09G 2310/08* (2013.01)

(58) Field of Classification Search
None
See application file for complete search history.

(56) References Cited

U.S. PATENT DOCUMENTS

| | | |
|---|---|---|
| 7,362,393 B2 | 4/2008 | Kim et al. |
| 7,580,023 B2 | 8/2009 | Pugh et al. |
| 2009/0059581 A1* | 3/2009 | Hayashi ............... G09G 3/3413 362/234 |

(Continued)

FOREIGN PATENT DOCUMENTS

| | | |
|---|---|---|
| KR | 2019970006136 Y1 | 6/1997 |
| KR | 100915238 B1 | 8/2009 |

(Continued)

OTHER PUBLICATIONS

Ido Hadar et al., Polarization Properties of Semiconductor Nanorod Heterostructures: From Single Particles to the Ensemble, Journal, 2013, pp. 502-507, vol. 4(3), The Journal of Physical chemistry Letters, American Chemical Society.

(Continued)

*Primary Examiner* — William Boddie
*Assistant Examiner* — Alecia D English
(74) *Attorney, Agent, or Firm* — Cantor Colburn LLP

(57) ABSTRACT

A display device includes a display panel comprising a first pixel and a second pixel, and a light source unit providing, to the display panel, a first light and a second light having different wavelengths from each other where the first pixel includes a wavelength conversion layer which transmits the first light and converts the second light into a third light to thereby emit the third light, and the second pixel includes a light transmission layer which transmits the first light and the second light.

37 Claims, 22 Drawing Sheets

(56) References Cited

U.S. PATENT DOCUMENTS

| | | | |
|---|---|---|---|
| 2013/0039032 A1* | 2/2013 | Kim | H01L 25/0753 362/84 |
| 2013/0107170 A1 | 5/2013 | Gee et al. | |
| 2013/0135558 A1 | 5/2013 | Kim et al. | |
| 2013/0300771 A1 | 11/2013 | Cho et al. | |
| 2013/0335799 A1 | 12/2013 | Yoon et al. | |
| 2014/0132890 A1 | 5/2014 | Zhang | |
| 2014/0152724 A1 | 6/2014 | Park et al. | |
| 2014/0192291 A1 | 7/2014 | Kang et al. | |
| 2014/0192294 A1 | 7/2014 | Chen et al. | |
| 2014/0268633 A1* | 9/2014 | Kwon | G09G 3/2025 362/84 |
| 2014/0268634 A1 | 9/2014 | Kang et al. | |
| 2015/0048348 A1 | 2/2015 | Huang et al. | |
| 2015/0062490 A1 | 3/2015 | Kwon | |
| 2015/0116381 A1* | 4/2015 | Kim | G09G 3/3413 345/691 |
| 2015/0346554 A1* | 12/2015 | Lee | G02F 1/133377 349/69 |

FOREIGN PATENT DOCUMENTS

| | | |
|---|---|---|
| KR | 1020140000735 A | 1/2014 |
| KR | 1020140089879 A | 7/2014 |
| KR | 1020140111876 A | 9/2014 |
| KR | 1020140113046 A | 9/2014 |
| WO | 2010095140 A2 | 8/2010 |

OTHER PUBLICATIONS

Extended European Search Report for Application No. 16171610.5 dated Oct. 19, 2016.

* cited by examiner

FIG. 14

|  |  | Conventional display device | Display device of present invention |
|---|---|---|---|
| Backlight unit | | 100% | 100% |
| Display panel | Lower polarizer | 50% | 50% |
| | Pixel region | 64% | 76% |
| | Liquid crystal layer | 100% | 80% |
| | Color filter | 31% | 93% |
| | Upper polarizer | 100% | 100% |
| Total transmittance | | 10% | 28% |
| Transmittance of display device of present invention compared to transmittance of conventional display device | | 1.0 | 2.9 |

FIG. 15

| Color | coordinates | Coordinates value |
|---|---|---|
| Red | x | 0.680 |
| | y | 0.319 |
| Green | x | 0.168 |
| | y | 0.753 |
| Blue | x | 0.164 |
| | y | 0.037 |
| Color reproducibility | | 116% |

DISPLAY DEVICE AND METHOD FOR DRIVING THE SAME

This application claims priority to Korean Patent Application No. 10-2015-0076029, filed on May 29, 2015, and all the benefits accruing therefrom under 35 U.S.C. § 119, the content of which in its entirety is herein incorporated by reference.

BACKGROUND

1. Field

Exemplary embodiments of the invention relate to a display device capable of significantly enhancing transmittance, a viewing angle, and color reproducibility and achieving super resolution, and to a method of driving the display device.

2. Description of the Related Art

A liquid crystal display ("LCD") is a type of flat panel display ("FPD"), which is most widely used these days. The LCD device includes two substrates including electrodes formed thereon and a liquid crystal layer interposed therebetween.

The LCD device is a display device that may adjust an amount of transmitted light by applying voltage to the two electrodes to rearrange liquid crystal molecules of the liquid crystal layer. To this end, the LCD device requires a backlight unit that provides light to the liquid crystal layer.

SUMMARY

When light provided from the backlight unit is transmitted through a polarizer, the liquid crystal layer, and a color filter of a liquid crystal display ("LCD") device, a considerable amount of light is lost, being reflected or absorbed. In general, only about 3% to about 10% of the light emitted from the backlight unit is utilized to display an image.

Embodiments of the invention are directed to a display device capable of significantly enhancing transmittance, a viewing angle, and color reproducibility and achieving super resolution, and to a method of driving the display device.

According to an exemplary embodiment of the invention, a display device includes a display panel comprising a first pixel and a second pixel, and a light source unit providing, to the display panel, a first light and a second light having different wavelengths. The first pixel may include a wavelength conversion layer which transmits the first light and converts the second light into a third light to thereby emit the third light, and the second pixel may include a light transmission layer which transmits the first light and the second light.

In an exemplary embodiment, the third light may have a wavelength between a wavelength of the first light and a wavelength of the second light.

In an exemplary embodiment, the light source unit may emit at least one of the first light and the second light in each predetermined period.

In an exemplary embodiment, the light source unit may selectively emit one of the first light and the second light and may not emit the other of the first light and the second light, in at least one period.

In an exemplary embodiment, the light source unit may the first light and the first pixel may externally emit the first light through the wavelength conversion layer, in a first period. The light source unit may emit the second light, the first pixel may externally emit the third light through the wavelength conversion layer, and the second pixel may block the second light, in a second period. The light source unit may emit the second light, the first pixel may block the second light, and the second pixel may externally emit the second light through the light transmission layer, in a third period.

In an exemplary embodiment, the second pixel may either emit the first light through the light transmission layer or block the first light, in the first period.

In an exemplary embodiment, the light source unit may emit the second light, the first pixel may externally emit the third light through the wavelength conversion layer, and the second pixel may block the second light, in the fourth period.

In an exemplary embodiment, the first image data signal applied to the first pixel in the first period and the second image data signal applied to the first pixel in the fourth period may have a voltage less than a voltage of an original image data signal.

In an exemplary embodiment, a total of the voltage of the first image data signal and the voltage of the second image data signal may be the same as the voltage of the original image data signal.

In an exemplary embodiment, the light source unit may emit the first light and the first pixel may externally emit the first light through the wavelength conversion layer, in the first period. The light source unit may emit the second light, the first pixel may externally emit the third light through the wavelength conversion layer, and the second pixel may externally emit the second light through the light transmission layer, in the second period.

In an exemplary embodiment, the second pixel may either externally emit the first light through the light transmission layer or block the first light, in the first period.

In an exemplary embodiment, the first pixel may further include a light blocking layer which blocks the second light emitted through the wavelength conversion layer.

In an exemplary embodiment, the first pixel further may include a light reflecting layer which directs the third light reflected from the wavelength conversion layer back toward the wavelength conversion layer.

In an exemplary embodiment, the wavelength conversion layer may receive at least one of the first light and the second light through a light control layer of the first pixel.

In an exemplary embodiment, the light transmission layer may receive at least one of the first light and the second light through a light control layer of the second pixel.

In an exemplary embodiment, the wavelength conversion layer may include a quantum dot or a quantum rod.

In an exemplary embodiment, the light transmission layer may include a transparent photosensitizer.

In an exemplary embodiment, the light transmission layer may include a light scattering member.

In an exemplary embodiment, the light scattering member may include titanium dioxide ($TiO_2$).

In an exemplary embodiment, the wavelength conversion layer may receive the first light and emit light having a wavelength substantially the same as a wavelength of the first light.

In an exemplary embodiment, the first pixel and the second pixel may be adjacent to each other.

In an exemplary embodiment, the first pixel and the second pixel may define a unit pixel.

According to an exemplary embodiment of the invention, a method of driving a display device includes a display panel including a first pixel and a second pixel, and a light source unit providing, to the display panel, a first light and a second light having different wavelengths, in which the first pixel includes a wavelength conversion layer which transmits the first light and converts the second light into a third light to thereby emit the third light, and the second pixel includes a light transmission layer which transmits the first light and the second light, the method including providing the first light to the display panel and setting the first pixel to be in a light transmission mode, in a first period, providing the second light to the display panel, setting the first pixel to be in a light transmission mode, and setting the second pixel to be in a light blocking mode, in a second period, and providing the second light to the display panel, setting the first pixel to be in a light blocking mode and setting the second pixel to be in a light transmission mode, in a third period.

In an exemplary embodiment, the third light may have a wavelength between a wavelength of the first light and a wavelength of the second light.

In an exemplary embodiment, the method may further include setting the second pixel to be either in the light transmission mode or in the light blocking mode in the first period.

In an exemplary embodiment, the method may further include providing the second light to the display panel, setting the first pixel to be in the light transmission mode, setting the second pixel to be in the light blocking mode, in the fourth period.

In an exemplary embodiment, the first image data signal applied to the first pixel in the first period and the second image data signal applied to the first pixel in the fourth period may have a voltage less than a voltage of an original image data signal.

In an exemplary embodiment, a total of the voltage of the first image data signal and the voltage of the second image data signal may be the same as the voltage of the original image data signal.

In an exemplary embodiment, the first pixel and the second pixel may be adjacent to each other.

In an exemplary embodiment, the first pixel and the second pixel may define a unit pixel.

In an exemplary embodiment, the light source unit may selectively emit one of the first light and the second light and may not emit the other of the first light and the second light, in at least one period.

According to an exemplary embodiment of the invention, a method of driving a display device includes a display panel including a first pixel and a second pixel, and a light source unit providing, to the display panel, a first light and a second light having different wavelengths, in which the first pixel includes a wavelength conversion layer which transmits the first light and converts the second light into a third light to thereby emit the third light, and the second pixel includes a light transmission layer which transmits the first light and the second light, the method including providing the first light to the display panel and setting the first pixel to be in a light transmission mode, in a first period, and providing the second light to the display panel and setting the first pixel and the second pixel to be in the light transmission mode, in a second period.

In an exemplary embodiment, the third light may have a wavelength between a wavelength of the first light and a wavelength of the second light.

In an exemplary embodiment, the method may further include setting the second pixel to be either in the light transmission mode or in a light blocking mode in the first period.

In an exemplary embodiment, the first pixel and the second pixel may be adjacent to each other.

In an exemplary embodiment, the first pixel and the second pixel may form a unit pixel.

In an exemplary embodiment, the light source unit may selectively emit one of the first light and the second light and may not emit the other of the first light and the second light, in at least one period.

BRIEF DESCRIPTION OF THE DRAWINGS

The above and other features and exemplary embodiments of the invention will be more clearly understood from the following detailed description taken in conjunction with the accompanying drawings, in which:

FIG. 14 is a view illustrating improvement in transmittance in the exemplary embodiment of the display device according to the invention; and FIG. 15 is a view illustrating improvement effects of color reproducibility of the exemplary embodiment of the display device according to the invention.

DETAILED DESCRIPTION

Figure 1:
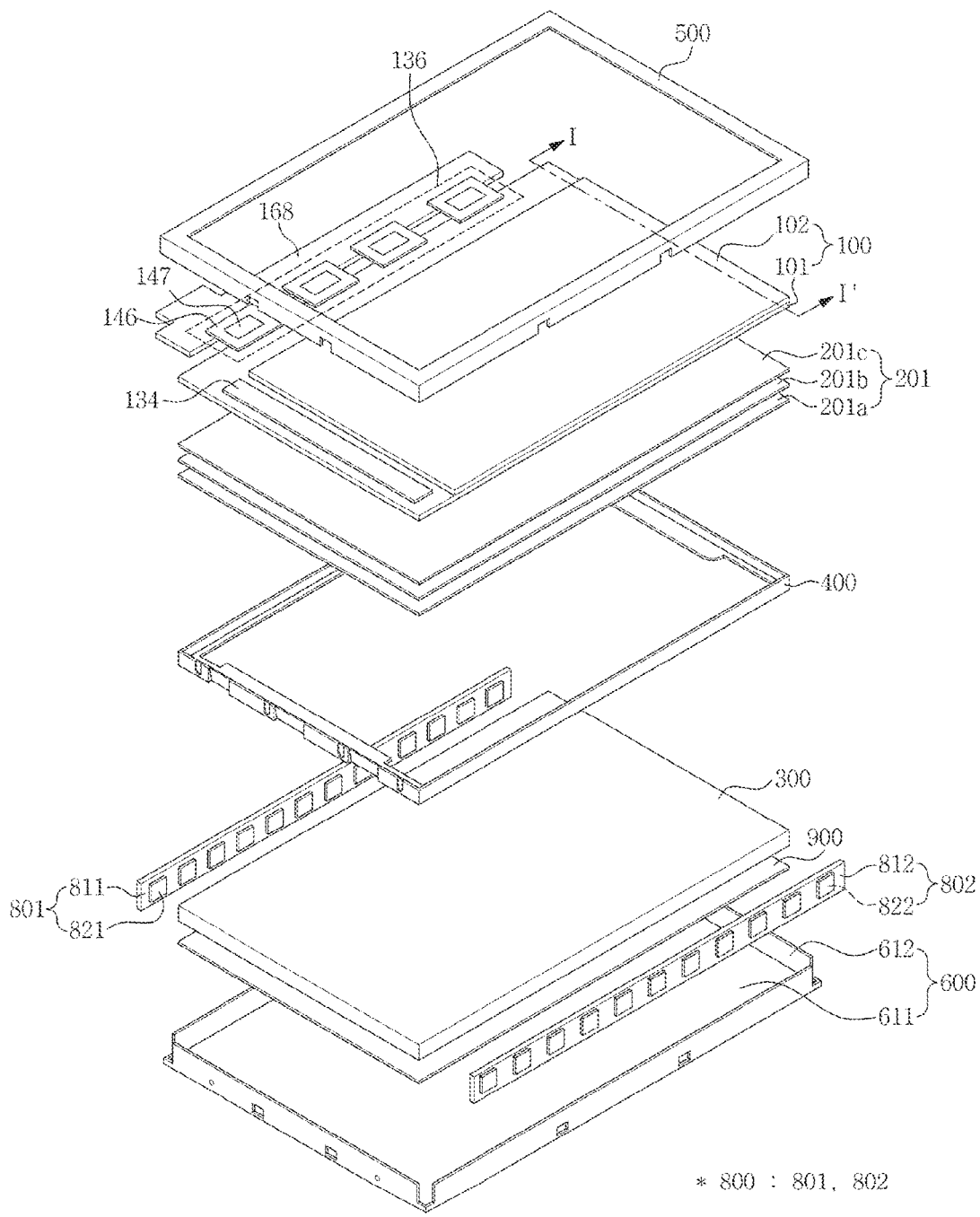
FIG. 1 is an exploded perspective view illustrating an exemplary embodiment of a display device according to the invention.

Advantages and features of the invention and methods for achieving them will be made clear from embodiments described below in detail with reference to the accompanying drawings. The invention may, however, be embodied in many different forms and should not be construed as being limited to the embodiments set forth herein. Rather, these embodiments are provided so that this invention will be thorough and complete, and will fully convey the scope of the invention to those skilled in the art. The invention is merely defined by the scope of the claims. Therefore, well-known constituent elements, operations and techniques are not described in detail in the embodiments in order to prevent the invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed there between. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device according to an exemplary embodiment will be described in detail with reference to FIGS. 1 to 12. Meanwhile, terms and names of elements used herein are chosen for ease of description and may differ from names used in actual products.

Figure 2:
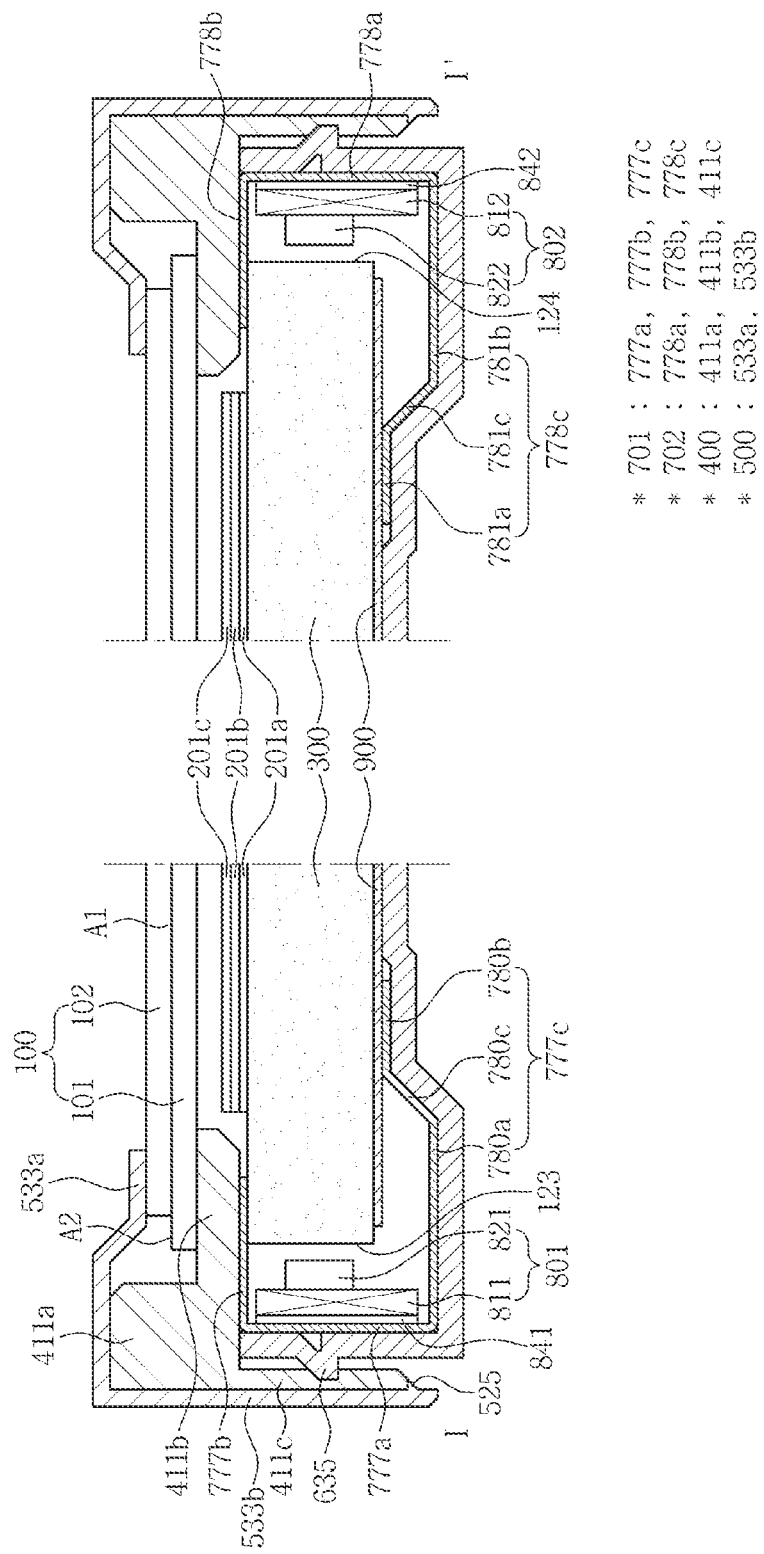
FIG. 2 is a cross-sectional view taken along line I-I' of FIG. 1.

FIG. 1 is an exploded perspective view illustrating a display device according to an exemplary embodiment; and FIG. 2 is a cross-sectional view taken along line I-I' of FIG. 1.

The display device according to the exemplary embodiment, as illustrated in FIGS. 1 and 2, includes a bottom case 600, a reflective sheet 900, a light guide plate 300, an optical sheet 201, a light source unit 800, a first light source cover 701, a second light source cover 702, a mold frame 400, a display panel 100, and a top case 500. The above-listed elements have a roundly curved shape in accordance with a curved surface.

Herein, a backlight unit includes the reflective sheet 900, the light guide plate 300, the optical sheet 201, the light source unit 800, the first light source cover 701, the second light source cover 702, and the mold frame 400. The display panel 100 and the backlight unit are assembled into a stacked structure to thereby constitute a display module. The display module may further include the top case 500 and the bottom case 600 for protecting and fixing the display panel 100 and the backlight unit and a driving circuit board (not illustrated) for driving the display panel 100.

An accommodation space is defined in the bottom case 600. The reflective sheet 900, the light guide plate 300, the optical sheet 201, the light source unit 800, the first light source cover 701, and the second light source cover 702 are disposed in the accommodation space. In order to secure the accommodation space, the bottom case 600 may include a base portion 611 and a plurality of side portions 612. In an exemplary embodiment, the base portion 611 may have a quadrangular shape, and the side portions 612 protrude from respective edge portions of the base portion 611, respectively, to have a predetermined height, for example. Edge portions of the side portions 612 that are adjacently disposed are connected to each other. A space defined by the side portions 612 and the base portion 611 corresponds to the aforementioned accommodation space. A locking projection 635 is disposed on the exterior side of the side portions 612 opposing one another and the mold frame 400 is fixed to the bottom case 600 by the locking projection 635. A portion of corresponding one of the side portions 612 may be bent to protrude toward the mold frame 400 so as to form the locking projection 635.

The light source unit 800 is configured to generate light. The light generated in the light source unit 800 may be provided to the display panel 100 through the light guide plate 300 and the optical sheet 201. The light source unit 800 generates lights having different wavelengths. In an exemplary embodiment, the light source unit 800 may generate a first light having a predetermined wavelength and a second light having a wavelength different from the wavelength of the first light, for example. To this end, the light source unit 800 may include, for example, a first light source unit 801 and a second light source unit 802. The first light source unit 801 generates the first light and the second light source unit 802 generates the second light.

The first light source unit 801 may include a first light source circuit board 811 and at least one first light source 821. A surface of the first light source circuit board 811, although not illustrated, is divided into at least one mounting portion and a wiring portion. In a case where two or more first light sources 821 are provided, the respective one of the first light sources 821 is disposed on each corresponding one of the mounting portions. Further, on the wiring portion, a plurality of wirings for transmitting a driving power to the first light sources 821 are embedded on the wiring portion. The aforementioned driving power is generated in an external power supply (not illustrated), and then applied to the plurality of wirings through a separate connector (not illustrated).

The first light source 821 emits the first light. In an exemplary embodiment, the first light source 821 may be a light emitting diode ("LED"), for example. In an exemplary embodiment, the first light source 821 may be one of a red LED emitting red light, a green LED emitting green light, and a blue LED emitting blue light, for example. The light emitted from the first light source 821 is directed to the light guide plate 300.

The second light source 802 may include a second light source circuit board 812 and at least one second light source 822. A surface of the second light source circuit board 812, although not illustrated, is divided into at least one mounting portion and a wiring portion. When two or more second light sources 822 are provided, the respective one of the second light sources 822 is disposed on each corresponding one of the mounting portions. Further, on the wiring portion, a plurality of wirings for transmitting a driving power to the second light sources 822 are embedded on the wiring portion. The aforementioned driving power is generated in an external power supply (not illustrated), and then applied to the plurality of wirings through a separate connector (not illustrated).

The second light source 822 emits the second light. In an exemplary embodiment, the second light source 822 may be an LED. In an exemplary embodiment, the second light source 822 may be one of the red LED emitting red light, the green LED emitting green light, and the blue LED emitting blue light, for example. In an alternative exemplary embodiment, the second light source 822 may be a light source emitting ultraviolet lay or near ultraviolet lay as the second light. The light emitted from the second light source 822 is directed to the light guide plate 300.

The first light source 821 includes an LED that emits light having a wavelength different from a wavelength of light emitted from an LED included in the second light source 822. In an exemplary embodiment, in a case where the first light source 821 is a red LED, the second light source 822 may be one of a green LED or a blue LED, for example.

The light guide plate 300 is configured to guide the light provided from the light source unit 800 to the display panel 100. The light guide plate 300 is disposed between the first light source unit 801 and the second light source unit 802. Among a plurality of surfaces of the light guide plate 300, a surface that faces the first light source 821 is set to be a first light incident surface 123 and another surface that faces the second light source 822 is set to be a second light incident surface 124.

The first light emitted from the first light source 821 is incident to the first light incident surface 123 and propagates toward the inside of the light guide plate 300. The light guide plate 300 causes total reflection of the first light incident therein to guide the first light toward the display area of the display panel 100. Further, the second light emitted from the second light source 822 is incident to the second light incident surface 124 and propagates toward the inside of the light guide plate 300. The light guide plate 300 causes total reflection of the second light incident therein to guide the second light toward the display area of the display panel 100. Although not illustrated, a plurality of scattering patterns may be further disposed on a lower exterior surface of the light guide plate 300, so as to improve reflectivity thereof.

In an exemplary embodiment, the light guide plate 300 may include a light transmissive material including acrylic resins, such as polymethyl methacrylate ("PMMA") and polycarbonate ("PC"), so as to efficiently guide light.

The reflective sheet 900 is disposed between the light guide plate 300 and the base portion 611 of the bottom case 600. The reflective sheet 900 re-reflects light being transmitted through the lower exterior surface of the light guide plate 300 and dissipated externally to be guided back toward the light guide plate 300, thereby minimizing light attenuation.

The optical sheet 201 is configured to diffuse and collimate light directed from the light guide plate 300. The optical sheet 201 is disposed between the light guide plate 300 and the display panel 100. The optical sheet 201 may include a diffusion sheet 201a, a light collimation sheet 201b, and a protective sheet 201c. The diffusion sheet 201a, a light collimation sheet 201b, and a protective sheet 201c are sequentially stacked on the light guide plate 300 in the order listed.

The diffusion sheet 201a diffuses the light guided from the light guide plate 300 to prevent partial concentration of the light.

The light collimation sheet 201b is disposed on the diffusion sheet 201a. The light collimation sheet 201b is configured to collimate light diffused from the diffusion sheet 201a toward a direction perpendicular to the display panel 100. To this end, prisms having a triangular cross-section may be aligned in a predetermined arrangement on one surface of the light collimation sheet 201b.

The protective sheet 201c is disposed on the collimation sheet 201b so as to protect a surface of the light collimation sheet 201b and to diffuse light so as to achieve uniform light distribution. The light being transmitted through the protective sheet 201c is directed toward the display panel 100.

The first light source cover 701 surrounds a side of the light guide plate 300 to accommodate the first light source unit 801 and the first light incident surface 123 of the light guide plate 300 within the accommodation space. The first light source cover 701 aligns the first light sources 821 on the first light incident surface 123 so as to accurately irradiate the first light emitted from the first light sources 821 to the first light incident surface 123 of the light guide plate 300.

In an exemplary embodiment, the first light source cover 701 may include a metal material, for example, stainless steel.

The first light source cover 701 may include a light-source embedding portion 777a, an upper cover 777b, and a lower cover 777c.

The upper cover 777b extends from an edge portion of a side of the light-source embedding portion 777a toward an upper exterior surface of the light guide plate 300.

The lower cover 777c extends from an edge portion of another side of the light-source embedding portion 777a toward the lower exterior surface of the light guide plate 300. The lower cover 777c may have various forms based on a form of the base portion 611 of the bottom case 600. In an exemplary embodiment, as illustrated in FIG. 2, the lower cover 777c may include a first horizontal portion 780a extending from the another side of the light-source embedding portion 777a to have a predetermined length, a second horizontal portion 780b disposed more adjacent to the lower surface of the light guide plate 300 than the first horizontal portion 780a is thereto, and an inclined portion 780c connecting the first horizontal portion 780a and the second horizontal portion 780b, for example.

The first light source 821 and the first light source circuit board 811 are disposed in a space surrounded by the light-source embedding portion 777a, the upper cover 777b, and the lower cover 777c. In this case, a first heat dissipation plate 841 may be disposed between the first light source circuit board 811 and the light-source embedding portion 777a.

The second light source cover 702 may include a light-source embedding portion 778a, an upper cover 778b, and a lower cover 778c.

The upper cover 778b extends from an edge portion of a side of the light-source embedding portion 778a toward the upper exterior surface of the light guide plate 300.

The lower cover 778c extends from an edge portion of another side of the light-source embedding portion 778a toward the lower exterior surface of the light guide plate 300. The lower cover 778c may have various forms based on a form of the base portion 611 of the bottom case 600. In an exemplary embodiment, as illustrated in FIG. 2, the lower cover 778c may include a first horizontal portion 781a extending from the another side of the light-source embedding portion 778a to have a predetermined length, a second horizontal portion 781b disposed more adjacent to the lower surface of the light guide plate 300 than the first horizontal portion 781a is thereto, and an inclined portion 781c connecting the first horizontal portion 781a and the second horizontal portion 781b, for example.

The second light source 822 and the second light source circuit board 812 are disposed in a space surrounded by the light-source embedding portion 778a, the upper cover 778b, and the lower cover 778c. In this case, a second heat dissipation plate 842 may be disposed between the second light source circuit board 812 and the light-source embedding portion 778a.

The mold frame 400 supports the display panel 100 and the top case 500 while being fixed to the bottom case 600, and maintains a uniform gap between the display panel 100 and the optical sheet 201. To this end, the mold frame 400 may have a quadrangular frame form including a first supporting portion 411a, a second supporting portion 411b, and a fixing portion 411c.

The first supporting portion 411a is disposed on the plurality of side portions 612 and supports the top case 500 disposed over the first supporting portion 411a.

The second supporting portion 411b extends from an interior edge portion of the first supporting portion 411a toward the optical sheet 201. The second supporting portion 411b has a height lower than the height of the first supporting portion 411a. A height difference between the first supporting portion 411a and the second supporting portion 411b defines a space between the top case 500 and the second supporting portion 411b, and an edge portion of the display panel 100 is disposed in the space.

The fixing portion 411c extends from the lower side surface of the first supporting portion 411a toward the side portion 612. A coupling groove is defined in an interior side surface of the fixing portion 411c, that is, a surface facing the locking projection 635 among surfaces of the fixing portion 411c. The locking projection 635 is coupled to the coupling groove, such that the mold frame 400 may be fixed to the bottom case 600.

The top case 500 has a quadrangular frame form having an opening defined in the center portion thereof. The top case 500 is disposed on the display panel 100. A display area A1 of the display panel 100 is exposed through the opening of the top case 500. The top case 500 covers the edge portion of the display panel 100, an upper surface and side surfaces of the first supporting portion 411a, and a side surface of the fixing portion 411c. To this end, the top case 500 includes a front surface cover 533a that covers the edge portion of the display panel 100 and the upper surface of the first supporting portion 411a and a side surface cover 533b that covers the side surface of the first supporting portion 411a and the side surface of the fixing portion 411c.

A hook 525 may be disposed on an interior side surface of the side surface cover 533b, and the hook 525 contacts a lower surface of the fixing portion 411c of the mold frame 400. The top case 500 may be fixed to the mold frame 400 by the hook 525. Further, one of the side surface covers 533b may have an aperture. The printed circuit board ("PCB") to be described below is exposed externally of the top case 500 through the aperture of the side surface cover 533b.

The display panel 100 is configured to display an image. The display panel 100 includes a lower panel 101 and an upper panel 102 opposing the lower panel 101. Herein, the display panel 100 will be described further with reference to FIGS. 1 to 3.

Figure 3A:
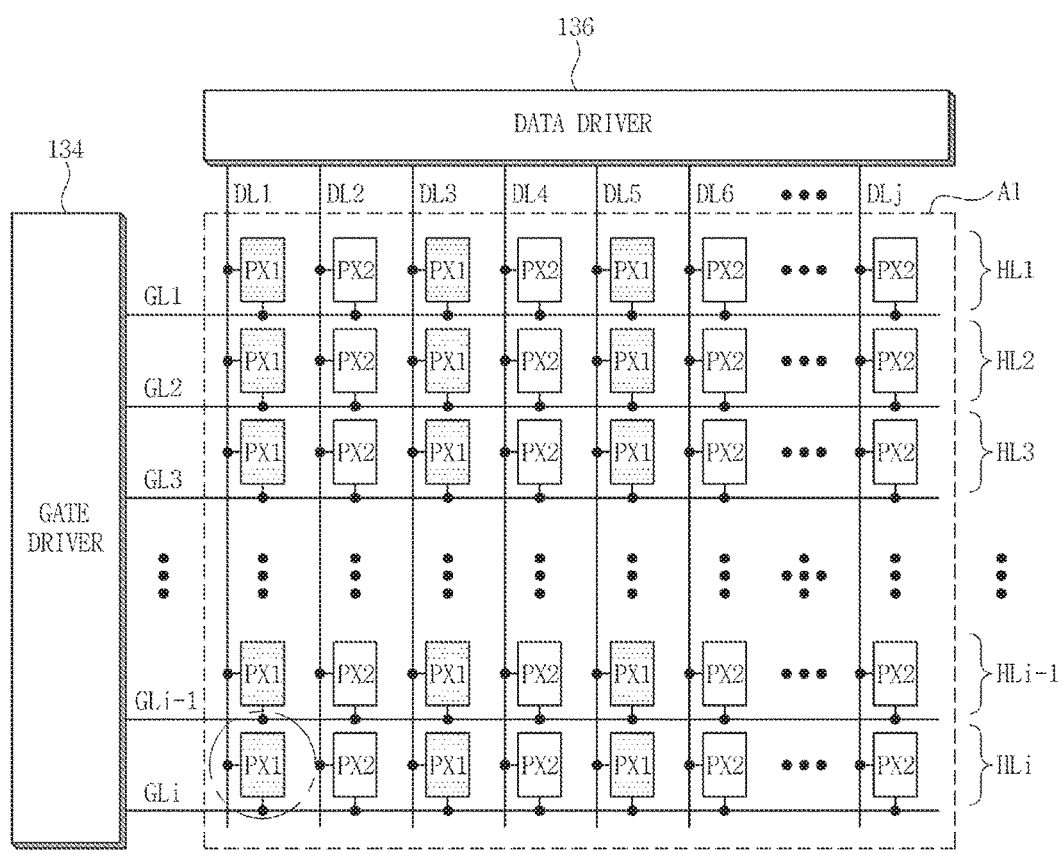
FIG. 3A is a view illustrating pixels disposed on a display panel of FIG. 1.
Figure 3B:
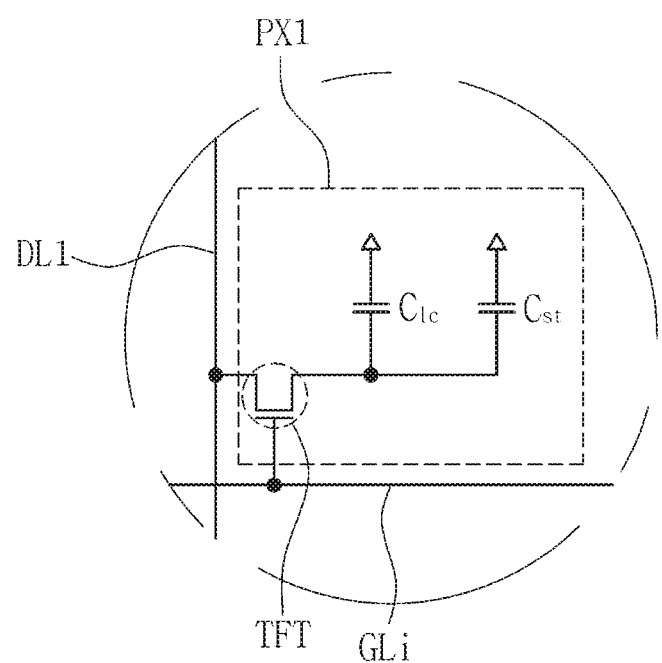
FIG. 3B is an enlarged view illustrating a pixel shown in FIG. 3A.

FIG. 3A is a view illustrating pixels disposed on the display panel 100 of FIG. 1, and FIG. 3B is an enlarged view illustrating a pixel shown in FIG. 3A.

As illustrated in FIGS. 1 and 2, the lower panel 101 may have an area larger than the area of the upper panel 102. The lower panel 101 is divided into a display area A1 and a non-display area A2, and the display area A1 of the lower panel 101 and the upper panel 102 opposes each other. The display area A1 has an area substantially the same as the area of the upper panel 102.

A light control layer 155 (refer to FIG. 5) is disposed between the display area A1 of the lower panel 101 and the upper panel 102, and any element that may control transmittance of the light emitted from the backlight unit may be used as the light control layer 155. In an exemplary embodiment, the light control layer 155 may be one of a liquid crystal layer, an electro-wetting layer, and an electrophoretic layer, for example. Hereinafter, the light control layer 155 is to be described as being a liquid crystal layer, for example.

Figure 5:
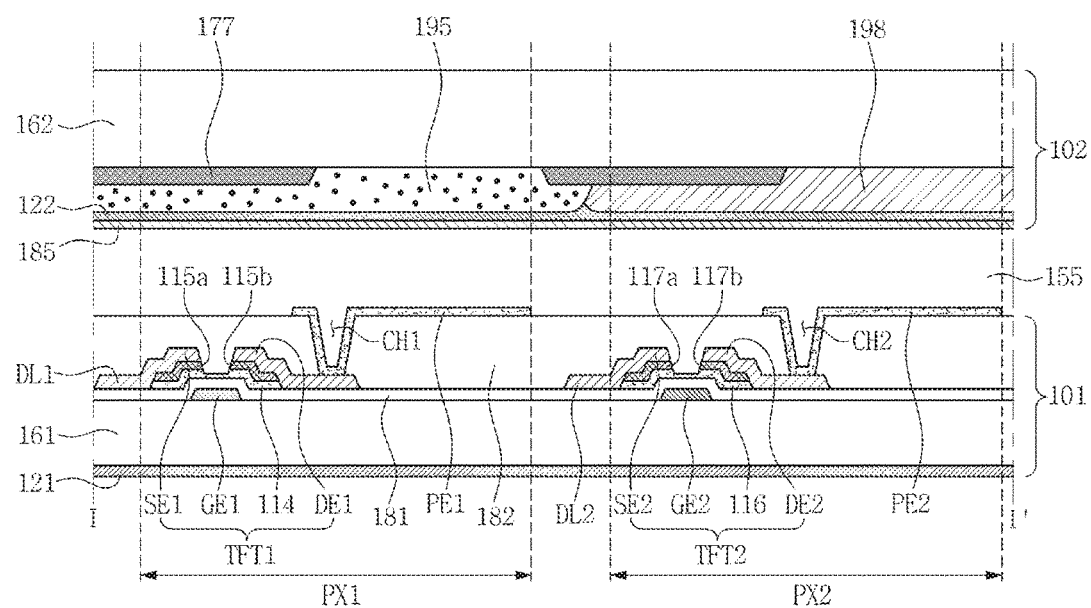
FIG. 5 is a cross-sectional view taken along line I-I' of FIG. 4.

The lower panel 101, as illustrated in FIGS. 3A and 3B, includes a plurality of gate lines GL1 to GLi, a plurality of data lines DL1 to DLj, and a lower polarizer 121 (refer to FIG. 5). The data lines DL1 to DLj intersect the gate lines GL1 to GLi. The gate lines GL1 to GLi extend toward the non-display area A2 to be connected to a gate driver 134, and the data lines DL1 to DLj extend toward the non-display area A2 to be connected to a data driver 136.

The gate driver 134 is disposed in the non-display area A2 of the lower panel 101. The gate driver 134 generates gate signals based on a gate control signal applied from a timing controller (not illustrated) and sequentially applies the gate signals to the plurality of gate lines. The gate driver 134 may include, for example, a shift register that shifts a gate start pulse based on a gate shift clock to produce gate signals. The shift register may include a plurality of driving transistors.

The data driver 136 includes a plurality of data driving integrated circuits ("ICs") 147. The data driving ICs 147 receive a digital image data signal and a data control signal applied thereto from the timing controller. The data driving ICs 147 samples the digital image data signals in response to the data control signal, latches the sampled image data signals corresponding to one horizontal line every horizontal period, and supplies the latched image data signal to the data lines DL1 to DLj. That is, the data driving ICs 147 converts the digital image data signals applied from the timing controller into analog image signals using a gamma voltage supplied from the power supply (not illustrated), and supplies the analog image signals to the data lines DL1 to DLj.

The data driving ICs 147 are mounted on carriers 146, respectively. The carriers 146 are connected between the PCB 168 and the display panel 100. The aforementioned timing controller and power supply may be disposed on the PCB 168. The carrier 146 includes input wirings configured to apply various signals applied thereto from the timing controller and the power supply to the data driving IC 147 and output wirings configured to transmit the image data signals output from the data driving IC 147 to the corresponding one of the data lines DL1 to DLj. At least one carrier 146 may further include auxiliary wirings to transmit various signals applied from the timing controller and the power supply to the gate driver 134, and the auxiliary wirings are connected to panel wirings on the lower panel 101. The panel wirings connect the auxiliary wirings to the gate driver 134. The panel wirings may be disposed on the lower panel 101 in a line-on-glass manner.

The upper panel 102 defines a plurality of pixels PX1 and PX2, along with the lower panel 101 and the liquid crystal layer 155. The pixels PX1 and PX2, as illustrated in FIGS. 3A and 3B, are disposed in the display area A1 of the display panel 100. The pixels PX1 and PX2 are divided into a first pixel PX1 and a second pixel PX2. Further, the upper panel 102 includes an upper polarizer 122 (refer to FIG. 5). A transmission axis of the upper polarizer 122 is perpendicular to a transmission axis of the lower polarizer 121.

The first pixel PX1 and the second pixel PX2 disposed adjacent to each other form a single unit pixel UPX. In an exemplary embodiment, as illustrated in FIGS. 3A and 3B, the first pixel PX1 and the second pixel PX2 disposed adjacent to each other and connected to the same gate line may form the single unit pixel UPX, for example.

The first pixel PX1 and the second pixel PX2 may be connected to different data lines, respectively. As illustrated in FIG. 3A by way of example, the first pixel PX1 may be connected to an odd-numbered data line, and the second pixel PX2 may be connected to an even-numbered data line.

"j" number of pixels arranged along an $n^{th}$ (n is a number selected from 1 to i) horizontal line (hereinafter, $n^{th}$ horizontal line pixels) are respectively connected to the first to the $j^{th}$ data lines (DL1 to DLj). Further, the $n^{th}$ horizontal line pixels are connected to the $n^{th}$ gate line together. Accordingly, the $n^{th}$ horizontal line pixels receive an $n^{th}$ gate signal together. That is, j pixels aligned in the same horizontal line receive the same gate signal, while pixels aligned in different horizontal lines receive different gate signals. In an exemplary embodiment, each of the first pixel PX1 and the second pixel PX2 disposed on the first horizontal line HL1 receives a first gate signal, while the first pixel PX1 and the second pixel PX2 disposed on the second horizontal line HL2 receive a second gate signal that has a different timing compared to the first gate signal, for example.

The first pixel PX1 and the second pixel PX2 each include a thin film transistor ("TFT"), a liquid crystal capacitor $C_{LC}$, and a storage capacitor $C_{st}$.

The TFT is turned on based on the gate signal applied thereto from the gate line GLi. The turned-on TFT applies the analog image data signals applied from the data line DL1 to the liquid crystal capacitor $C_{LC}$ and the storage capacitor $C_{st}$.

The liquid crystal capacitor $C_{LC}$ includes a pixel electrode and an opposing electrode opposing each other. In an exemplary embodiment, the opposing electrode may be a front gate line or a common line transmitting a common voltage.

Herein, the first pixel PX1 and the second pixel PX2 included in the unit pixel UPX will be described in more detail hereinbelow.

Figure 4:
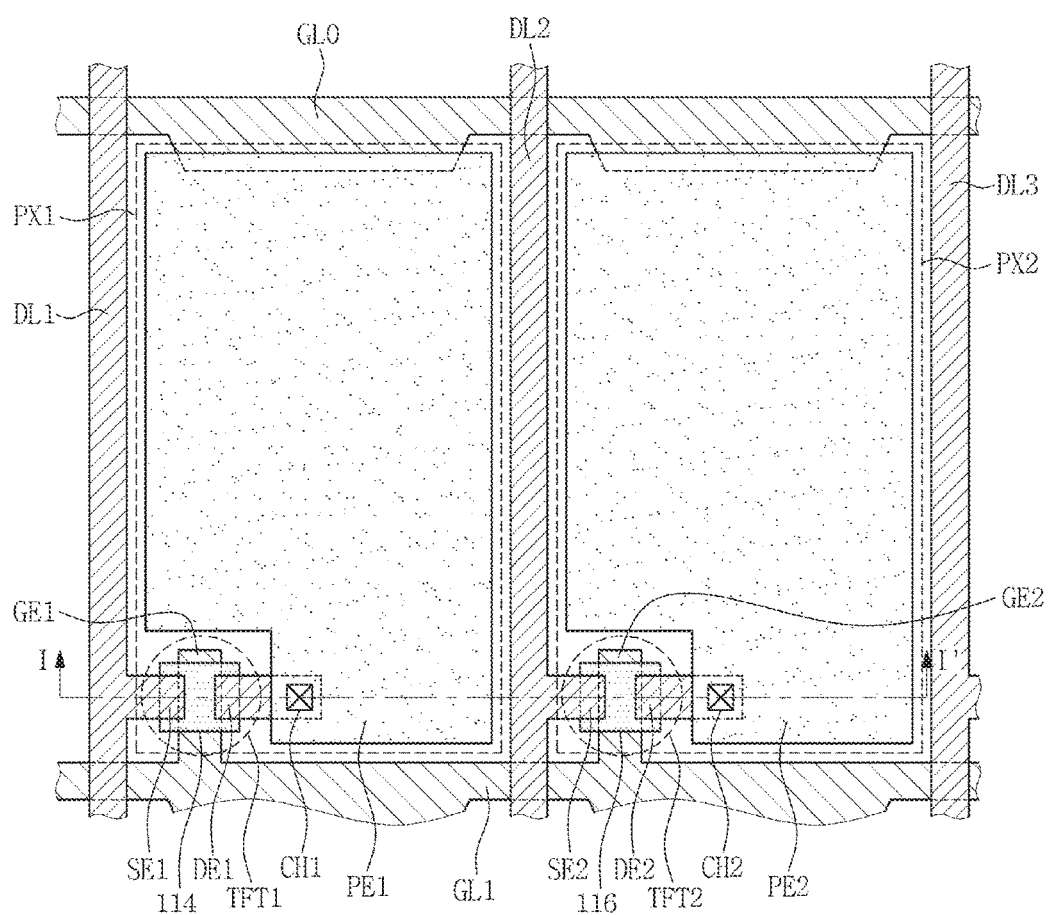
FIG. 4 is a plan view illustrating a first pixel and a second pixel included in a unit pixel of FIG. 3A.

FIG. 4 is a plan view illustrating the first pixel PX1 and the second pixel PX2 included in the unit pixel UPX of FIG. 3A, and FIG. 5 is a cross-sectional view taken along line I-I' of FIG. 4.

The first pixel PX1, as illustrated in FIGS. 4 and 5, includes a first pixel transistor TFT1, a first pixel electrode PE1, and a wavelength conversion layer 195.

The second pixel PX2, as illustrated in FIGS. 4 and 5, includes a second pixel transistor TFT2, a second pixel electrode PE2, and a light transmission layer 198.

In addition, the first pixel PX1 and the second pixel PX2 include the lower polarizer 121, a lower substrate 161, a gate insulating layer 181, a passivation layer 182, a liquid crystal layer 155, a common electrode 185, the upper polarizer 122, a light blocking layer 177, and an upper substrate 162, in common.

The lower panel 101 includes a lower substrate 161, the first pixel transistor TFT1, the second pixel transistor TFT2, the first pixel electrode PE1, the second pixel electrode PE2, the gate insulating layer 181, the passivation layer 182, and the lower polarizer 121.

The first pixel transistor TFT1 includes a semiconductor layer 114, a first ohmic contact layer 115a, a second ohmic contact layer 115b, a gate electrode GE1, a source electrode SE1, and a drain electrode DE1.

The gate electrode GE1 and the gate line GL1 are unitary. The gate electrode GE1 is disposed on the lower substrate 161. In an exemplary embodiment, at least one of the gate line GL1 and the gate electrode GE1 may include at least one of aluminum (Al) or alloys thereof, silver (Ag) or alloys thereof, copper (Cu) or alloys thereof, and/or molybdenum (Mo) or alloys thereof, for example. In alternative exemplary embodiments, at least one of the gate line GL1 and the gate electrode GE1 may include at least one of chromium (Cr), tantalum (Ta), and titanium (Ti), for example. In alternative exemplary embodiments, at least one of the gate line GL1 and the gate electrode GE1 may have a multi-layer structure including at least two conductive layers having different physical properties.

In reference to FIG. 4, "GL0" refers to a dummy gate line, and the dummy gate line GL0 is disposed on the same layer as a layer on which the gate line is disposed. The dummy gate line GL0 overlaps the first and second pixel electrodes PE1 and PE2 of the first and second pixels PX1 and PX2 connected to the first gate line GL1. The storage capacitors Cst are provided between the dummy gate line GL0 and the first pixel electrode PE1 of the first pixel PX1 and between the dummy gate line GL0 and the second pixel electrode PE2 of the second pixel PX2, respectively. The dummy gate line GL0 may include the same material as that included in the gate line.

The semiconductor layer 114 is disposed on the gate insulating layer 181. In this case, the semiconductor layer 114 overlaps the gate electrode GE1 disposed below the gate insulating layer 181. In an exemplary embodiment, the semiconductor layer 114 may include amorphous silicon, polycrystalline silicon, or the like, for example.

First and second ohmic contact layers 115a and 115b are disposed on the semiconductor layer 114. The first and second ohmic contact layers 115a and 115b are disposed on the semiconductor layer 114 to correspond to portions aside from a channel region of the semiconductor layer 114. The first and second ohmic contact layers 115a and 115b are separated from each other. In an exemplary embodiment, the first and second ohmic contact layers 115a and 115b may each include silicide or n+ hydrogenated amorphous silicon doped with n-type impurities, such as phosphorus, at high concentration.

The source electrode SE1 and the data line DL1 are unitary. The source electrode SE1 is disposed on the first ohmic contact layer 115a.

The drain electrode DE1 is disposed on the second ohmic contact layer 115b. The drain electrode DE1 is connected to the first pixel electrode PE1.

In an exemplary embodiment, at least one of the data line DL1, the source electrode SE1, and the drain electrode DE1 may include refractory metal, such as molybdenum, chromium, tantalum, titanium, or a metal alloy thereof. In an alternative exemplary embodiment, at least one of the data line DL1, the source electrode SE1, and the drain electrode DE1 may have a multi-layer structure including a refractory metal layer and a low-resistance conductive layer. Examples of the multi-layer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In alternative exemplary embodiments, at least one of the data line DL1, the source electrode SE1, and the drain electrode DE1 may include various metals or conductors rather than the aforementioned materials.

The first pixel electrode PE1 is disposed on the passivation layer 182. In this case, the first pixel electrode PE1 is connected to the drain electrode DE1 through a contact hole CH1 in the passivation layer 182. In an exemplary embodiment, the first pixel electrode PE1 may include a transparent conductive material ("TCO"), such as indium tin oxide ("ITO") or indium zinc oxide ("IZO"). In an exemplary embodiment, ITO may be a polycrystalline or monocrystalline material, and IZO may be a polycrystalline or monocrystalline material, as well.

The second pixel transistor TFT2 includes a semiconductor layer 116, a first ohmic contact layer 117a, a second ohmic contact layer 117b, a gate electrode GE2, a source electrode SE2, and a drain electrode DE2. The semiconductor layer 116, the first ohmic contact layer 117a, the second ohmic contact layer 117b, the gate electrode GE2, the source electrode SE2, and the drain electrode DE2 are substantially the same as the semiconductor layer 114, the first ohmic contact layer 115a, the second ohmic contact layer 115b, the gate electrode GE1, the source electrode SE1, and the drain electrode DE1 described in the foregoing, and thus the description with regard to the elements of the second pixel transistor TFT2 will make reference to those of the description with regard to the elements of the first pixel transistor TFT1. The second pixel electrode PE2 is connected to the drain electrode DE2 through a contact hole CH2 in the passivation layer 182.

The gate insulating layer 181 is disposed over an entire surface of the lower substrate 161 that includes respective one of the gate lines and the gate electrodes. In an exemplary embodiment, the gate insulating layer 181 may include silicon nitride ($SiN_x$) or silicon oxide ($SiO_x$), for example. In an alternative exemplary embodiment, the gate insulating layer 181 may have a multi-layer structure including at least two insulating layers having different physical properties.

The passivation layer 182 is disposed over an entire surface of the lower substrate 161 that includes respective one of the source electrodes and the drain electrodes. In an exemplary embodiment, the passivation layer 182 may include an inorganic material, such as of silicon nitride ($SiN_x$) or silicon oxide ($SiO_x$). In a case where passivation layer 182 includes an inorganic insulating material, an inorganic insulating material having photosensitivity and having a dielectric constant of about 4.0 may be used. In alternative exemplary embodiments, the passivation layer 182 may have a double-layer structure including a lower inorganic layer and an upper organic layer, which has been found to impart desirable insulating properties and also to prevent damage to exposed portions of the semiconductor layers 114 and 116. As examples, the passivation layer 182 may have a thickness greater than or equal to about 5000 angstroms (Å), or in a range of about 6000 Å to about 8000 Å.

The lower polarizer 121 is disposed on a rear surface of the lower substrate 161.

The upper panel 102 includes the upper substrate 162, the light blocking layer 177, the wavelength conversion layer 195, the light transmission layer 198, an upper polarizer 122, and the common electrode 185.

The light blocking layer 177 is disposed on the upper substrate 162. The light blocking layer 177 includes a plurality of apertures. The apertures are disposed corresponding to the first and second pixel electrodes PE1 and PE2 of the first and second pixels PX1 and PX2, respectively. In an exemplary embodiment, the light blocking layer 177 has a first aperture in a portion corresponding to the first pixel electrode PE1, and has a second aperture in a portion corresponding to the second pixel electrode PE2, for example. The light blocking layer 177 blocks light in portions aside from the apertures. In an exemplary embodiment, the light blocking layer 177 is disposed on the first and second pixel transistors TFT1 and TFT2, the gate lines GL1 to GLi, and data lines DL1 to DLj to prevent light transmitted therethrough from being directed externally, for example.

The wavelength conversion layer 195 is disposed on the first pixel PX1. In an exemplary embodiment, the wavelength conversion layer 195, as illustrated in FIG. 5, may be disposed in the aperture of the light blocking layer 177 corresponding to the first pixel electrode PE1 of the first pixel PX1, for example. In other words, the wavelength conversion layer 195 may be disposed on a portion of the upper substrate 162 that is exposed through the aperture. In this case, an edge portion of the wavelength conversion layer 195 may be disposed on the light blocking layer 177.

The wavelength conversion layer 195 transmits the first light. Further, the wavelength conversion layer 195 converts the wavelength of the second light to emit the third light.

The wavelength of the first light is longer than the wavelength of the second light. Further, the wavelength of the third light is shorter than the wavelength of the first light and longer than the wavelength of the second light. In other words, the third light has a wavelength between the wavelength of the first light and the wavelength of the second light. In an exemplary embodiment, in a case where a red LED is used as the first light source 821 and a blue LED is used as the second light source 822, the wavelength conversion layer 195 transmits the red light emitted from the first light source 821 as it is, but converts the blue light emitted from the second light source 822 into a green light to emit the green light, for example. Herein, the green light has a wavelength shorter than that of the red light and longer than that of the blue light.

To this end, the wavelength conversion layer 195 may include quantum particles, for example. In an exemplary embodiment, the wavelength conversion layer 195 may include at least one metal based on sulfide, silicon (Si), and nitride, for example.

The quantum dot particle converts wavelength of light to emit a desired light. Based on the size of the quantum dot particle, the wavelength of the light emitted from the wavelength conversion layer 195 may vary. In other words, based on the diameter of the quantum dot, the color of light emitted from the wavelength conversion layer 195 may vary.

The quantum dot particle may have a diameter in a range of about 2 nm to about 10 nm. In general, in a case where the quantum dot particle has a small diameter, the wavelength of the emitted light may decrease to emit blue-based light. Further, as the size of the quantum dot increase, the wavelength of the emitted light increases to emit red-based light. In an exemplary embodiment, a quantum dot particle having a diameter of about 10 nm may emit red light, a quantum dot particle having a diameter of about 7 nm may emit green light, and a quantum dot particle having a diameter of about 5 nm may emit blue light, for example.

The quantum dot particle may have a double-structure including an inner core and an outer shell surrounding the inner core. In an exemplary embodiment, the quantum dot particle that is composed of CdSe/ZnS includes an inner core including CdSe and an outer shell including ZnS, for example.

In alternative exemplary embodiments, the wavelength conversion layer 195 may include a quantum rod, in lieu of the quantum dot particle.

The light transmission layer 198 is disposed on the second pixel PX2. In an exemplary embodiment, the light transmission layer 198, as illustrated in FIG. 5, may be disposed in the aperture of the light blocking layer 177 corresponding to the second pixel electrode PE2 of the second pixel PX2, for example. In other words, the light transmission layer 198 may be disposed on a portion of the upper substrate 162 that is exposed through the aperture. In this case, an edge portion of the light transmission layer 198 may be disposed on the light blocking layer 177.

The light transmission layer 198 transmits each of the first light and the second light. In an exemplary embodiment, in a case where a red LED is used as the first light source 821 and a blue LED is used as the second light source 822, the light transmission layer 198 transmits the red light emitted from the first light source 821 as it is, and transmits the blue light emitted from the second light source 822 as it is, for example. To this end, the light transmission layer 198 may include a transparent photoresist.

The light transmission layer 198 may further include a light scattering member. In an exemplary embodiment, the light scattering member may use titanium dioxide ($TiO_2$), for example.

The upper polarizer 122 is disposed on the wavelength conversion layer 195 and the light transmission layer 198. A transmission axis of the upper polarizer 122 is perpendicular to a transmission axis of the lower polarizer 121, and one of the transmission axes of the lower polarizer 121 and the upper polarizer 122 may be aligned parallel to the gate line GL.

The common electrode 185 is disposed on the upper polarizer 122. In an exemplary embodiment, the common electrode 185 may be disposed over an entire surface of the upper substrate 162 that includes the upper polarizer 122, for example. In an exemplary embodiment, the common electrode 185 may transmit a common voltage which is a direct current ("DC") voltage, for example. In an alternative exemplary embodiment, the common electrode 185 may transmit an alternating current ("AC") voltage. In an exemplary embodiment, the common electrode may include a TCO such as ITO or IZO.

The common electrode 185 generates an electric field over the liquid crystal layer 155, along with the first and second pixel electrodes PE1 and PE2. Accordingly, a first electric field is generated over the liquid crystal layer 155 between the common electrode 185 and the first pixel electrode PE1, and a second electric field is generated over the liquid crystal layer 155 between the common electrode 185 and the second pixel electrode PE2.

Hereinafter, a driving operation of the display device having the configuration described in the foregoing will be described in detail.

Figure 6:
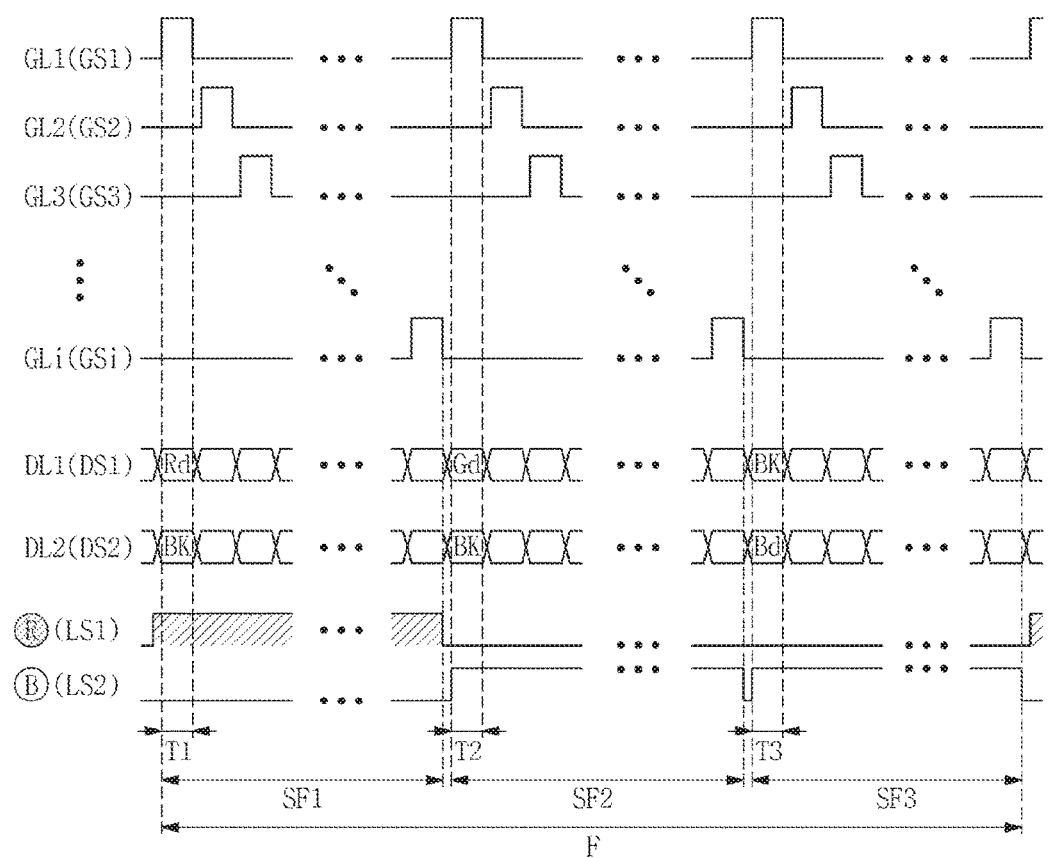
FIG. 6 is a timing diagram illustrating gate signals, image data signals, and light source driving signals generated in a single field period.
Figure 7A:
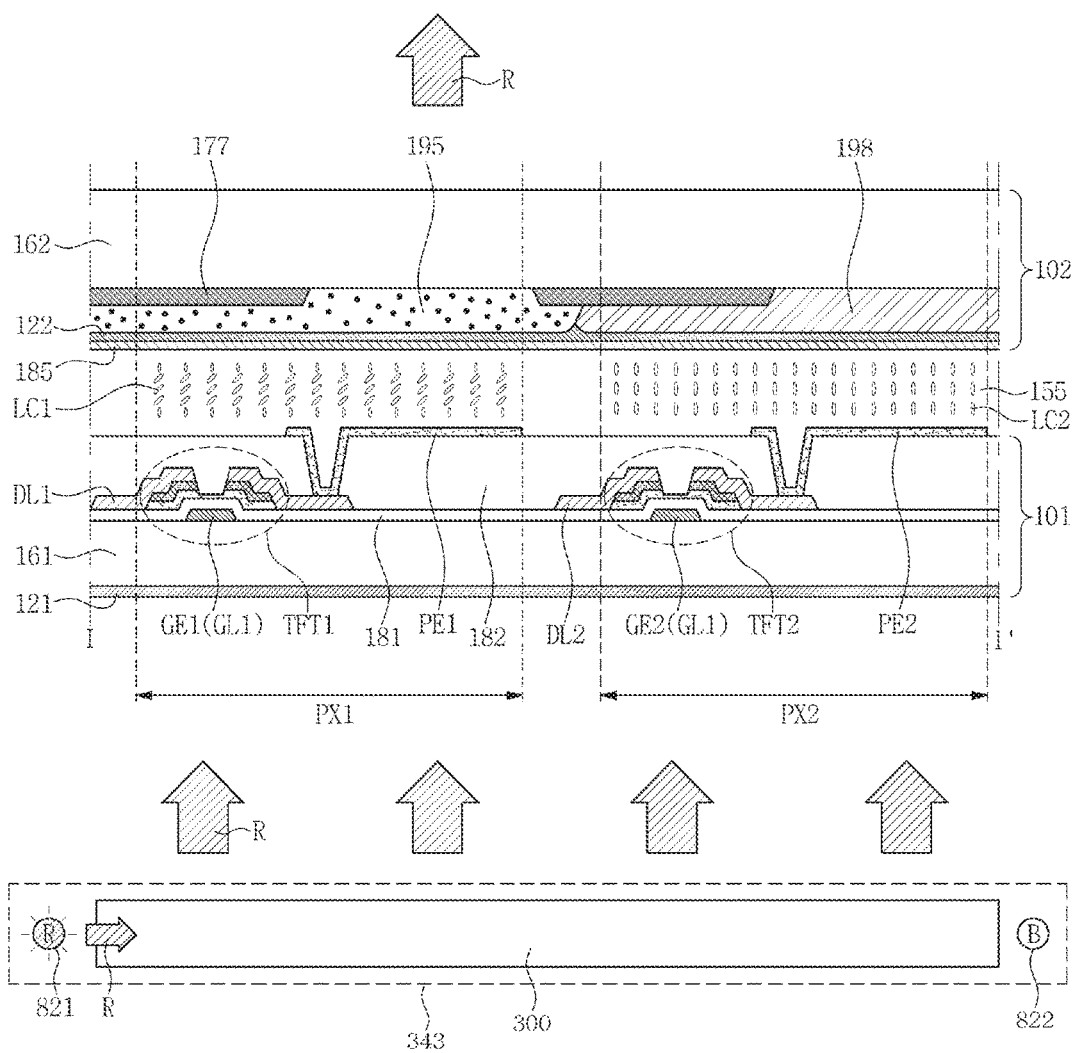
FIGS. 7A to 7C are views illustrating a driving operation of a display device receiving signals of FIG. 6.
Figure 7B:
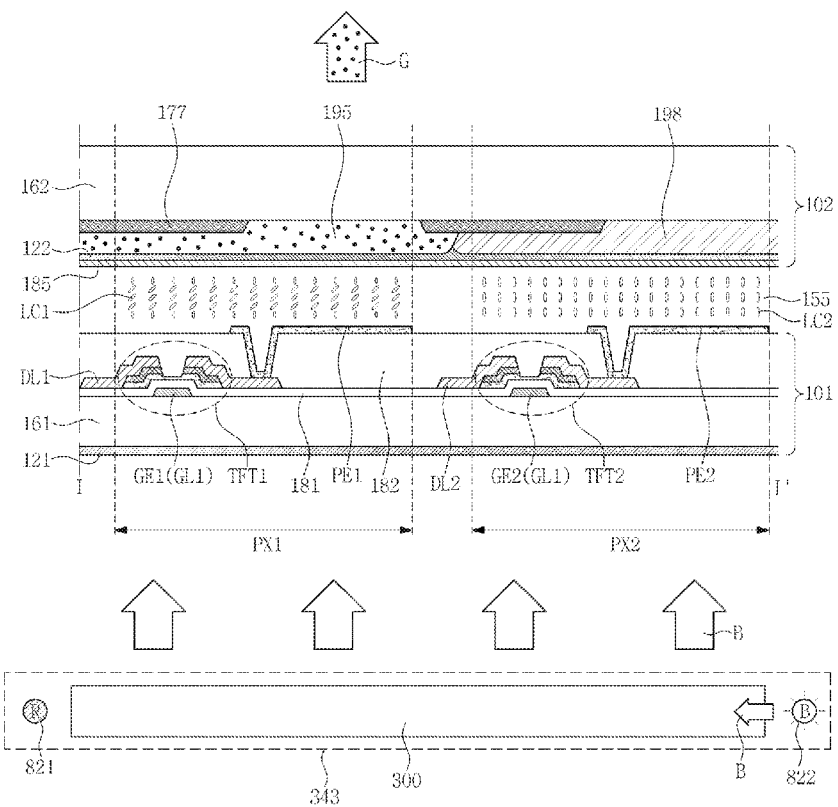
Figure 7C:
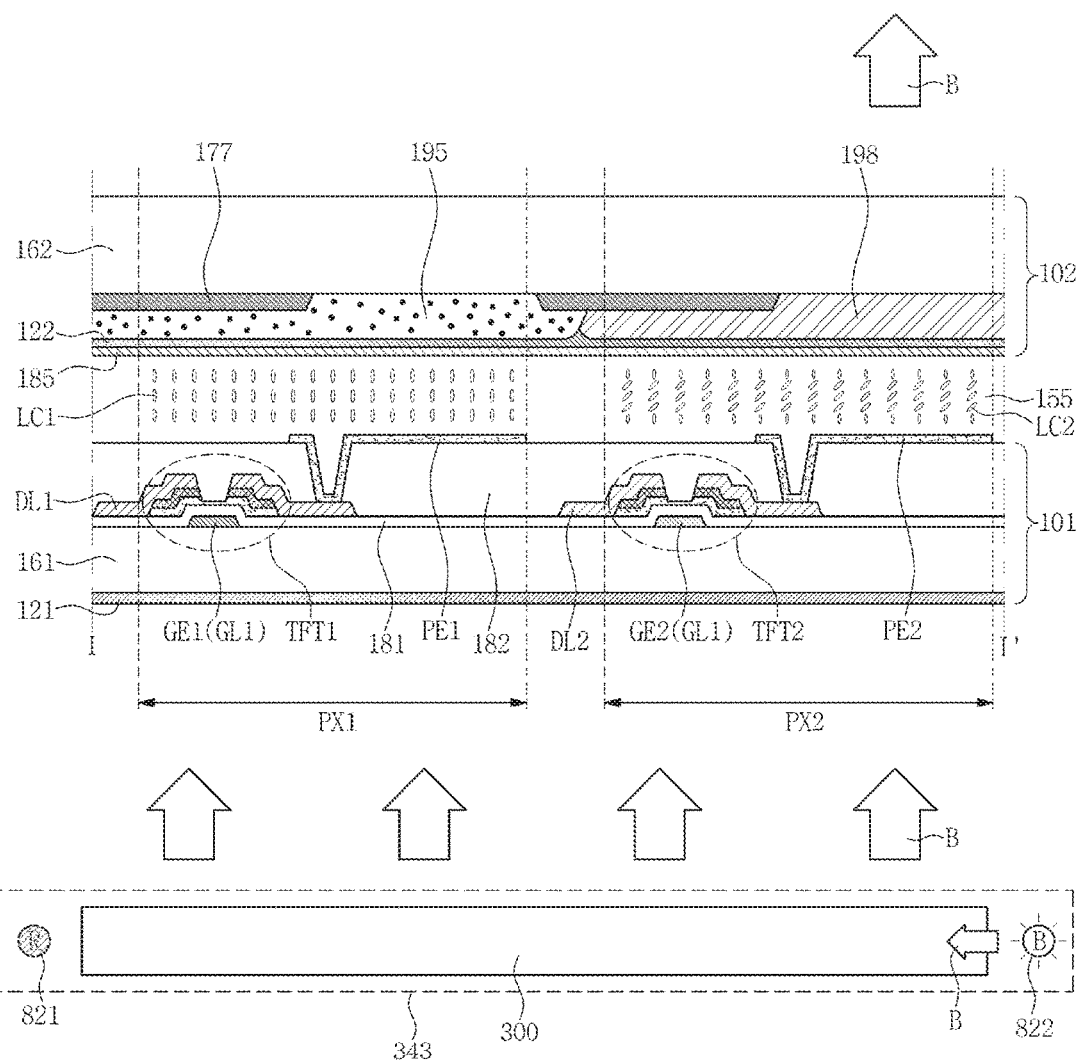

FIG. 6 is a timing diagram illustrating the gate signals, the image data signals, and the light source driving signals generated in a single field period F. FIGS. 7A to 7C are views illustrating a driving operation of a display device receiving signals of FIG. 6.

The display device according to an exemplary embodiment sequentially displays a red image, a green image, and a blue image in the single field period F, that is, a single frame period. That is, the display device according to the invention displays an image in a field sequential color ("FSC") manner, for example.

The single field period F, as illustrated in FIG. 6, may include three sub-field periods SF1, SF2, and SF3. In this case, first to $i^{th}$ gate signals GS1 to GSi are sequentially generated in each field period. The first to $i^{th}$ gate signals GS1 to GSi are sequentially applied to the first to $i^{th}$ gate lines GL1 to GLi. In an exemplary embodiment, the first to $i^{th}$ gate signals GS1 to GSi are generated sequentially in the first sub-field period SF1, the first to $i^{th}$ gate signals GS1 to GSi are generated again sequentially in the second sub-field period SF2, and subsequently, the first to $i^{th}$ gate signals GS1 to GSi are generated again sequentially in the third sub-field period SF3, for example. Although not illustrated, a blank period may further be included between adjacent sub-field periods. During the blank period, gate signals and data signals to be required in a sub-field period subsequent to the blank period may be prepared.

The first light source 821 is turned on in the first sub-field period SF1 and is turned off in the second sub-field period SF2 and the third sub-field period SF3. The second light source 822 is turned on in the second sub-field period SF2 and the third sub-field period SF3 and is turned off in the first sub-field period SF1. To this end, a first light source driving signal LS1 applied to the first light source 821 maintains a high state during the first sub-field period SF1 and maintains a low state during the second sub-field period SF2 and the third sub-field period SF3. A second light source driving signal LS2 applied to the second light source 822 maintains the high state during the second sub-field period SF2 and the third sub-field period SF3 and maintains the low state during the first sub-field period SF1. Herein, it is assumed that the first light source 821 emits the first light having a wavelength corresponding to the red light R, and the second light source 822 emits the second light having a wavelength corresponding to the blue light B, for example.

FIG. 6 illustrates a first image data signal DS1 applied to the first data line DL1 and a second image data signal DS2 applied to the second data line DL2. The first image data signal DS1 includes a red image data signal Rd, a green image data signal Gd, and a black image data signal BK. The second image data signal DS2 includes a black image data signal BK and a blue image data signal Bd. Herein, the red image data signal Rd, the green image data signal Gd, and the blue image data signal Bd are a voltage signal having a voltage level greater than or less than the voltage level of the common voltage applied to the common electrode 185, and the black image data signal BK is a voltage signal having a voltage level substantially the same as the voltage level of the common voltage.

In an exemplary embodiment, the single field period F illustrated in FIG. 6 may be driven at a speed of, for example, about 180 hertz (Hz). In this case, the first sub-field period SF1 may be driven at a speed of A Hz, the second sub-field period SF2 may be driven at a speed of B Hz, and the third sub-field period SF3 may be driven at a speed of C Hz, and in this case "A+B+C" may be about 180 Hz, for example. In an exemplary embodiment, A, B, and C may each be about 60 Hz, for example.

Hereinafter, a driving operation of the first pixel PX1 and the second pixel PX2 during a first horizontal period T1 in the first sub-field period SF1 will be described with reference to FIGS. 6 and 7A.

The first gate signal GS1 has the high state during the first horizontal period T1 in the first sub-field period SF1. The first gate signal GS1 in the high state is applied to the first gate line GL1. Accordingly, the first pixel transistor TFT1 receiving the first gate signal GS1 through the first gate line GL1 and the gate electrode GE1 is turned on, and the second pixel transistor TFT2 receiving the first gate signal GS1 through the first gate line GL1 and the gate electrode GE2 is turned on.

In addition, the red image data signal Rd is applied to the first data line DL1 and the black image data signal BK is applied to the second data line DL2, during the first horizontal period T1 in the first sub-field period SF1. Accordingly, the red image data signal Rd applied from the first data line DL1 is applied to the first pixel electrode PE1 through the turned-on first pixel transistor TFT1, and the black image data signal BK applied from the second data line DL2 is applied to the second pixel electrode PE2 through the turned-on second pixel transistor TFT2.

Accordingly, an electric field is generated between the first pixel electrode PE1 applied with the red image data signal Rd and the common electrode 185, and due to the electric field, liquid crystal molecules LC1 included in the liquid crystal layer 155 between the first pixel electrode PE1 and the common electrode 185 are rotated. In an exemplary embodiment, the liquid crystal layer 155 may include liquid crystal molecules that have negative dielectric anisotropy and are aligned homeotropically, and in this case, the liquid crystal molecules may be rotated based on the electric field and may have a major axis tilted by a predetermined angle with respect to a surface of a substrate (i.e., a surface of the lower substrate 161 or a surface of the upper substrate 162), for example. Hereinafter, the liquid crystal layer 155 is to be understood to include liquid crystal molecules having negative dielectric anisotropy and aligned homeotropically, for example.

The electric field is absent between the second pixel electrode PE2 applied with the black image data signal BK and the common electrode 185. This is because the black image data signal BK and the common voltage of the common electrode 185 have a voltage of substantially the same voltage level. Accordingly, the liquid crystal molecules LC2 included in the liquid crystal layer 155 between the second pixel electrode PE2 and the common electrode 185 maintains an initial alignment without rotation. That is, the liquid crystal molecules LC2 may have a major axis aligned perpendicularly to the surface of the substrate.

Further, during the aforementioned first horizontal period T1 in the first sub-field period SF1, the first light source driving signal LS1 in the high state is applied to the first light source 821 and the second light source driving signal LS2 in the low state is applied to the second light source 822. Accordingly, the first light source 821 maintains a turned-on state, and the second light source 822 maintains a turned-off state, during the first horizontal period T1. In other word, during the first horizontal period T1, the first light source 821 emits the first light (hereinafter, "red light R"), while the second light source 822 does not emit the second light (hereinafter, "blue light B"). The red light R emitted from the first light source 821 is linearly polarized through the lower polarizer 121. That is, the red light R is polarized along the transmission axis of the lower polarizer 121. Further, the red light R, which is linearly polarized, is incident to the entire portion of the liquid crystal layer 155 including the liquid crystal layer 155 of the first pixel PX1 and the liquid crystal layer 155 of the second pixel PX2.

The red light R, linearly polarized and being incident to the liquid crystal layer 155 of the first pixel PX1, is elliptically polarized while being transmitted through the liquid crystal layer 155. This is because the liquid crystal molecules LC1 included in the liquid crystal layer 155 of the first pixel PX1 has a major axis aligned parallel to the surface of the substrate. The red light R, which is elliptically polarized, is incident to the upper polarizer 122. As being an elliptically polarized light, the red light R incident to the upper polarizer 122 may be transmitted through the upper polarizer 122. Accordingly, the red light R, which is elliptically polarized, may be incident to the wavelength conversion layer 195 through the upper polarizer 122. Since the wavelength of the red light R is not in a wavelength range that may be converted by the wavelength conversion layer 195, the wavelength conversion layer 195 transmits the red light R, which is elliptically polarized, to be emitted externally as it is. In this case, the red light R is externally emitted from the wavelength conversion layer 195 through the upper substrate 162. Accordingly, the first pixel PX1 emits the red light R during the first horizontal period T1 in the first sub-field period SF1.

The red light R, linearly polarized, being incident to the liquid crystal layer 155 of the second pixel PX2 may not experience any polarization shift while being transmitted through the liquid crystal layer 155. This is because the liquid crystal molecules LC2 included in the liquid crystal layer 155 of the second pixel PX2 has a major axis aligned perpendicularly to the surface of the substrate. The red light R, which is linearly polarized, is incident to the upper polarizer 122. As being a linearly polarized light that is polarized in a direction intersecting an optical axis of the upper polarizer 122, the red light R incident to the upper polarizer 122 may not be transmitted through the upper polarizer 122. Accordingly, the red light R, which is linearly polarized, may not be emitted externally. Accordingly, the second pixel PX2 may not emit any light during the first horizontal period T1 in the first sub-field period SF1.

As described in the foregoing, the first pixel PX1 is operated in a light transmission mode and the second pixel PX2 is operated in a light blocking mode, during the first horizontal period T1 in the first sub-field period SF1. Accordingly, the first pixel PX1 displays a red image by emitting the red light R based on the red image data signal Rd and the second pixel PX2 blocks the red light R applied from the backlight unit 343 based on the black image data signal BK, during the first horizontal period T1 in the first sub-field period SF1. As a result, the unit pixel UPX including the first pixel PX1 and the second pixel PX2 emits the red light R during the first horizontal period T1 in the first sub-field period SF1. In other words, the unit pixel UPX displays a red image during the first horizontal period T1 in the first sub-field period SF1.

During each horizontal period in the first sub-field period SF1, the first pixel PX1 and the second pixel PX2 may be operated in the same manner as the first pixel PX1 and the second pixel PX2 are operated during the first horizontal period T1 in the first sub-field period SF1. Accordingly, the unit pixels UPX each display a red image in the first sub-field period SF1.

In another exemplary embodiment, the red image data signal Rd, in lieu of the black image data signal BK, may be applied to the second pixel PX2 during the first horizontal period T1 in the first sub-field period SF1. That is, the second pixel PX2 may be operated in the light transmission mode during the first horizontal period T1 in the first sub-field period SF1. In this case, the red light R may be emitted from the second pixel PX2 during the first horizontal period T1.

Hereinafter, a driving operation of the first pixel PX1 and the second pixel PX2 during a second horizontal period T2 in the second sub-field period SF2 will be described with reference to FIGS. 6 and 7B.

The first gate signal GS1 has the high state during the second horizontal period T2 in the second sub-field period SF2. The first gate signal GS1 in the high state is applied to the first gate line GL1. Accordingly, the first pixel transistor TFT1 receiving the first gate signal GS1 through the first gate line GL1 and the gate electrode GE1 is turned on, and the second pixel transistor TFT2 receiving the first gate signal GS1 through the first gate line GL1 and the gate electrode GE2 is turned on.

In addition, during the second horizontal period T2 in the second sub-field period SF2, the green image data signal Gd is applied to the first data line DL1 and the black image data signal BK is applied to the second data line DL2. Accordingly, the green image data signal Gd applied from the first data line DL1 is applied to the first pixel electrode PE1 through the turned-on first pixel transistor TFT1, and the black image data signal BK applied from the second data line DL2 is applied to the second pixel electrode PE2 through the turned-on second pixel transistor TFT2.

Accordingly, an electric field is generated between the first pixel electrode PE1 applied with the green image data signal Gd and the common electrode 185, and due to the electric field, the liquid crystal molecules LC1 included in the liquid crystal layer 155 between the first pixel electrode PE1 and the common electrode 185 are rotated. Accordingly, the liquid crystal molecules LC1 may be rotated due to the electric field and may have a major axis tilted by a predetermined angle with respect to the surface of the substrate.

The electric field is absent between the second pixel electrode PE2 applied with the black image data signal BK and the common electrode 185. Accordingly, the liquid crystal molecules LC2 included in the liquid crystal layer 155 between the second pixel electrode PE2 and the common electrode 185 maintain an initial alignment without rotation. That is, the liquid crystal molecules LC2 may have a major axis aligned perpendicularly to the surface of the substrate.

Further, during the aforementioned second horizontal period T2 in the second sub-field period SF2, the first light source driving signal LS1 in the low state is applied to the first light source 821 and the second light source driving signal LS2 in the high state is applied to the second light source 822. Accordingly, the first light source 821 maintains a turned-off state, and the second light source 822 maintains a turned-on state, during the second horizontal period T2. In other word, during the second horizontal period T2, the first light source 821 does not emit the red light R, while the second light source 822 emits the blue light B. The blue light B emitted from the second light source 822 is linearly polarized through the lower polarizer 121. That is, the blue light B is polarized along the transmission axis of the lower polarizer 121. Further, the blue light B, which is linearly polarized, is incident to the entire portion of the liquid crystal layer 155 including the liquid crystal layer 155 of the first pixel PX1 and the liquid crystal layer 155 of the second pixel PX2.

The blue light B, linearly polarized, being incident to the liquid crystal layer 155 of the first pixel PX1 is elliptically polarized while being transmitted through the liquid crystal layer 155, and the blue light B, which is elliptically polarized, is incident to the upper polarizer 122. As being an elliptically polarized light, the blue light B incident to the upper polarizer 122 may be transmitted through the upper polarizer 122. Accordingly, the blue light B, which is elliptically polarized, may be incident to the wavelength conversion layer 195 through the upper polarizer 122. Since the wavelength of the blue light B is in the wavelength range that may be converted by the wavelength conversion layer 195, the wavelength conversion layer 195 converts the wavelength of the blue light B, which is elliptically polarized. In an exemplary embodiment, the wavelength conversion layer 195 may convert the blue light B into a third light (hereinafter, "green light G") having a wavelength longer than the wavelength of the blue light B and shorter than the wavelength of the red light R to thereby emit the green light G, for example. In this case, the green light G is externally emitted from the wavelength conversion layer 195 through the upper substrate 162. Accordingly, the first pixel PX1 emits the green light G during the second horizontal period T2 in the second sub-field period SF2.

The blue light B, linearly polarized, being incident to the liquid crystal layer 155 of the second pixel PX2 may not experience any polarization shift while being transmitted through the liquid crystal layer 155. The blue light B, which is linearly polarized, is incident to the upper polarizer 122. As being a linearly polarized light that is polarized in a direction intersecting an optical axis of the upper polarizer 122, the blue light B incident to the upper polarizer 122 may not be transmitted through the upper polarizer 122. Accordingly, the blue light B, which is linearly polarized, may not be emitted externally. Accordingly, the second pixel PX2 may not emit any light during the second horizontal period T2 in the second sub-field period SF2.

As described in the foregoing, the first pixel PX1 is operated in a light transmission mode and the second pixel PX2 is operated in a light blocking mode, during the second horizontal period T2 in the second sub-field period SF2. Accordingly, the first pixel PX1 displays a green image by emitting the green light G based on the green image data signal Gd and the second pixel PX2 blocks the blue light B applied from the backlight unit 343 based on the black image data signal BK, during the second horizontal period T2 in the second sub-field period SF2. As a result, the unit pixel UPX including the first pixel PX1 and the second pixel PX2 emits the green light G during the second horizontal period T2 in the second sub-field period SF2. In other words, the unit pixel UPX displays a green image during the second horizontal period T2 in the second sub-field period SF2.

During each horizontal period in the second sub-field period SF2, the first pixel PX1 and the second pixel PX2 may be operated in the same manner as the first pixel PX1 and the second pixel PX2 are operated during the second horizontal period T2 in the second sub-field period SF2. Accordingly, the unit pixels UPX each display a green image in the second sub-field period SF2.

Hereinafter, a driving operation of the first pixel PX1 and the second pixel PX2 during a third horizontal period T3 in the third sub-field period SF3 will be described with reference to FIGS. 6 and 7C.

The first gate signal GS1 has the high state during the third horizontal period T3 in the third sub-field period SF3. The first gate signal GS1 in the high state is applied to the first gate line GL1. Accordingly, the first pixel transistor TFT1 receiving the first gate signal GS1 through the first gate line GL1 and the gate electrode GE1 is turned on, and the second pixel transistor TFT2 receiving the first gate signal GS1 through the first gate line GL1 and the gate electrode GE2 is turned on.

In addition, during the third horizontal period T3 in the third sub-field period SF3, the black image data signal BK is applied to the first data line DL1 and the blue image data signal Bd is applied to the second data line DL2. Accordingly, the black image data signal BK applied from the first data line DL1 is applied to the first pixel electrode PE1 through the turned-on first pixel transistor TFT1, and the blue image data signal Bd applied from the second data line DL2 is applied to the second pixel electrode PE2 through the turned-on second pixel transistor TFT2.

Further, an electric field is absent between the first pixel electrode PE1 applied with the black image data signal BK and the common electrode 185. Accordingly, the liquid crystal molecules LC1 included in the liquid crystal layer 155 between the first pixel electrode PE1 and the common electrode 185 maintain an initial alignment without rotation. That is, the liquid crystal molecules LC1 may have a major axis aligned perpendicularly to the surface of the substrate.

An electric field is generated between the second pixel electrode PE2 applied with the blue image data signal Bd and the common electrode 185, and due to the electric field, liquid crystal molecules LC2 included in the liquid crystal layer 155 between the second pixel electrode PE2 and the common electrode 185 are rotated. Accordingly, the liquid crystal molecules LC2 may be rotated due to the electric field and may have a major axis tilted by a predetermined angle with respect to the surface of the substrate.

Further, during the aforementioned third horizontal period T3 in the third sub-field period SF3, the first light source driving signal LS1 in the low state is applied to the first light source 821 and the second light source driving signal LS2 in the high state is applied to the second light source 822. Accordingly, the first light source 821 maintains a turned-off state, and the second light source 822 maintains a turned-on state, during the third horizontal period T3. In other word, during the third horizontal period T3, the first light source 821 does not emit the red light R, while the second light source 822 emits the blue light B. The blue light B emitted from the second light source 822 is linearly polarized through the lower polarizer 121. That is, the blue light B is polarized along the transmission axis of the lower polarizer 121. Further, the blue light B, which is linearly polarized, is incident to the entire portion of the liquid crystal layer 155 including the liquid crystal layer 155 of the first pixel PX1 and the liquid crystal layer 155 of the second pixel PX2.

The blue light B, linearly polarized, being incident to the liquid crystal layer 155 of the first pixel PX1 may not experience any polarization shift while being transmitted through the liquid crystal layer 155. The blue light B, which is linearly polarized, is incident to the upper polarizer 122. As being a linearly polarized light that is polarized in a direction intersecting an optical axis of the upper polarizer 122, the blue light B incident to the upper polarizer 122 may not be transmitted through the upper polarizer 122. Accordingly, the blue light B, which is linearly polarized, may not be emitted externally. Accordingly, the first pixel PX1 may not emit any light during the third horizontal period T3 in the third sub-field period SF3.

The blue light B, linearly polarized, being incident to the liquid crystal layer 155 of the second pixel PX2 is elliptically polarized while being transmitted through the liquid crystal layer 155, and the blue light B, which is elliptically polarized, is incident to the upper polarizer 122. As being an elliptically polarized light, the blue light B incident to the upper polarizer 122 may be transmitted through the upper polarizer 122. Accordingly, the blue light B, which is elliptically polarized, is incident to the light transmission layer 198 through the upper polarizer 122. The blue light B, which is elliptically polarized, is transmitted through the light transmission layer 198 to be externally emitted as it is. In this case, the blue light B is externally emitted from the light transmission layer 198 through the upper substrate 162. Accordingly, the second pixel PX2 emits the blue light B during the third horizontal period T3 in the third sub-field period SF3.

As described in the foregoing, the first pixel PX1 is operated in a light blocking mode and the second pixel PX2 is operated in a light transmission mode, during the third horizontal period T3 in the third sub-field period SF3. Accordingly, the first pixel PX1 blocks the blue light B applied from the backlight unit 343 based on the black image data signal BK, and the second pixel PX2 displays a blue image by emitting the blue light B based on the blue image data signal Bd. As a result, the unit pixel UPX including the first pixel PX1 and the second pixel PX2 emits the blue light B during the third horizontal period T3 in the third sub-field period SF3. In other words, the unit pixel UPX displays a blue image during the third horizontal period T3 in the third sub-field period SF3.

During each horizontal period in the third sub-field period SF3, the first pixel PX1 and the second pixel PX2 may be operated in the same manner as the first pixel PX1 and the second pixel PX2 are operated during the third horizontal period T3 in the third sub-field period SF3. Accordingly, the unit pixels UPX each display a blue image in the third sub-field period SF3.

Accordingly, the red image in the first sub-field period SF1, the green image in the second sub-field period SF2, and the blue image in the third sub-field period SF3 are sequentially displayed in the single field period F, and thereby an image corresponding to the single field may be displayed.

With regard to FIGS. 6, 7A, 7B, and 7C, the order of the first, second, and third sub-field periods SF1, SF2, and SF3 commencing the operation in the single field period F may be modified differently. In an exemplary embodiment, the operation corresponding to the third sub-field period SF3 may be performed firstly, the operation corresponding to the second sub-field period SF2 may be performed subsequently, and the operation corresponding to the first sub-field period SF1 may be performed lastly, for example. The aforementioned example is given by way of example, and the order of the first, second, and third sub-field periods SF1, SF2, and SF3 is susceptible to various modifications. Further, the order of the first, second, and third sub-field periods SF1, SF2, and SF3 commencing the operation in a single frame period may differ from the order of the first, second, and third sub-field periods SF1, SF2, and SF3 commencing the operation in another frame period. In an exemplary embodiment, while the operation corresponding to the first sub-field period SF1 is performed firstly, the operation corresponding to the second sub-field period SF2 is performed subsequently, and the operation corresponding to the third sub-field period SF3 is performed lastly in the first frame period, the operation corresponding to the third sub-field period SF3 may be performed firstly, the operation corresponding to the second sub-field period SF2 may be performed subsequently, and the operation corresponding to the first sub-field period SF1 may be performed lastly in the second frame period, for example.

The display device according to the invention may display a single unit image during two sub-field periods, which will be described in detail with reference to FIGS. 8, 9A, and 9B.

Figure 8:
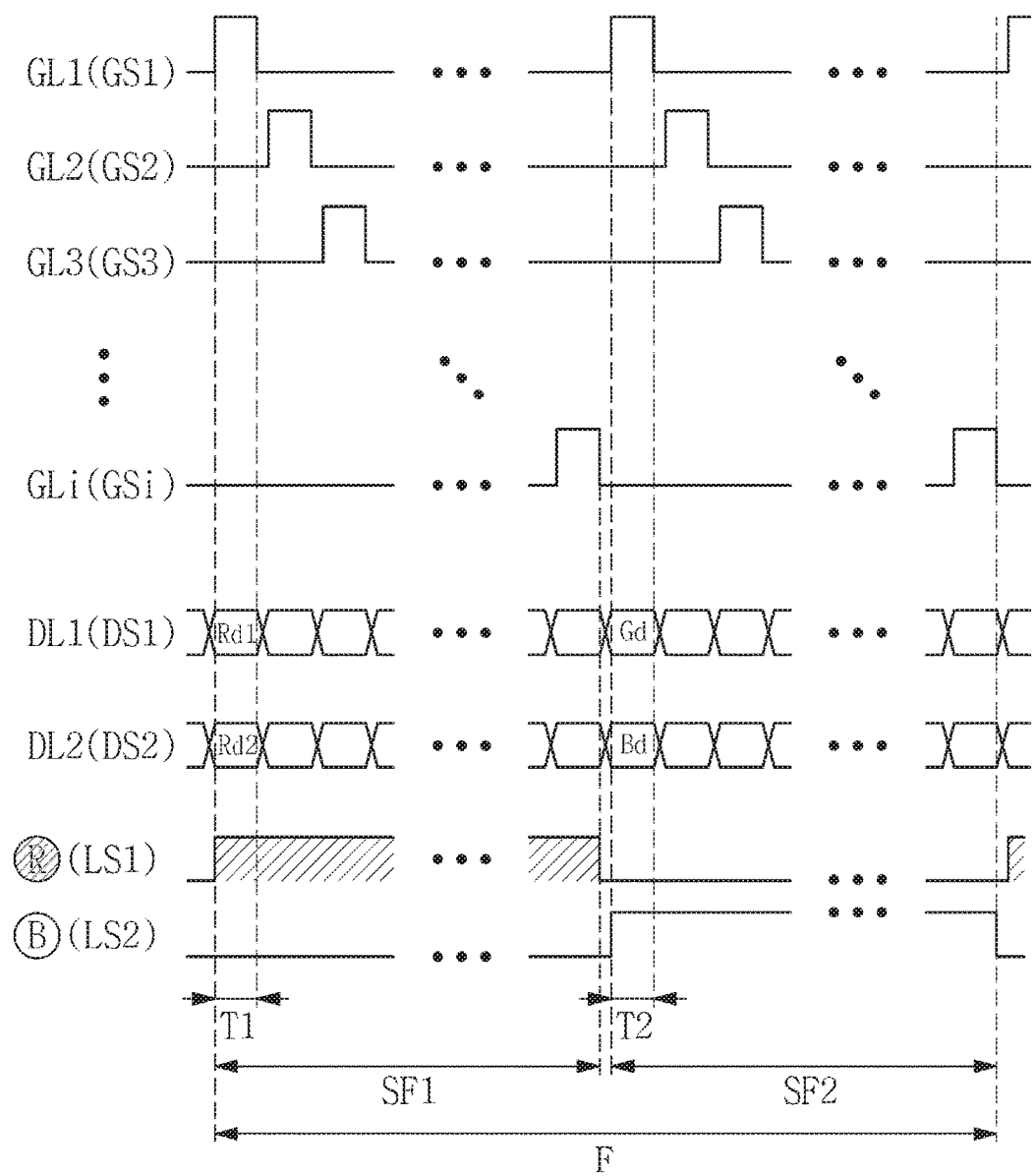
FIG. 8 is another timing diagram illustrating gate signals, image data signals, and light source driving signals generated in a single field period.

FIG. 8 is another timing diagram illustrating gate signals, image data signals, and light source driving signals generated in a single field period. FIGS. 9A and 9B are views illustrating a driving operation of the display device receiving signals of FIG. 8.

The display device according to an exemplary embodiment sequentially displays a red image, a green image, and a blue image in the single field period F, that is, a single frame period. That is, the display device according to the invention displays an image in an FSC manner. The single field period F, as illustrated in FIG. 8, may include two sub-field periods SF1 and SF2. In this case, first to $i^{th}$ gate signals GS1 to GSi are sequentially generated in each field period. The first to $i^{th}$ gate signals GS1 to GSi are sequentially applied to the first to $i^{th}$ gate lines GL1 to GLi. In an exemplary embodiment, the first to $i^{th}$ gate signals GS1 to GSi are generated sequentially from the first gate signal GS1 in the first sub-field period SF1, and subsequently, the first to $i^{th}$ gate signals GS1 to GSi are generated again sequentially from the first gate signal GS1 in the second sub-field period SF2, for example. Although not illustrated, a blank period may further be included between adjacent sub-field periods.

The first light source 821 is turned on in the first sub-field period SF1 and is turned off in the second sub-field period SF2. The second light source 822 is turned on in the second sub-field period SF2 and is turned off in the first sub-field period SF1. To this end, the first light source driving signal LS1 applied to the first light source 821 maintains the high state during the first sub-field period SF1 and maintains the low state during the second sub-field period SF2. The second light source driving signal LS2 applied to the second light source 822 maintains the high state during the second sub-field period SF2 and maintains the low state during the first sub-field period SF1. Herein, it is assumed that the first light source 821 emits the first light having a wavelength corresponding to the red light R, and the second light source 822 emits the second light having a wavelength corresponding to the blue light B.

FIG. 8 illustrates a first image data signal DS1 applied to the first data line DL1 and a second image data signal DS2 applied to the second data line DL2. The first image data signal DS1 includes a first red image data signal Rd1 and a green image data signal Gd. The second image data signal DS2 includes a second red image data signal Rd2 and a blue image data signal Bd. Herein, the first red image data signal Rd1, the green image data signal Gd, the second red image data signal Rd2, and the blue image data signal Bd are a voltage signal having a voltage level greater than or less than the voltage level of the common voltage applied to the common electrode 185.

In an exemplary embodiment, the single field period F illustrated in FIG. 8 may be driven at a speed of, for example, about 120 Hz, for example. In this case, the first sub-field period may be driven at a speed of A Hz and the second sub-field period may be driven at a speed of B Hz, and in this case "A+B" may be about 120 Hz. In an exemplary embodiment, A and B may each be about 60 Hz, for example.

Hereinafter, a driving operation of the first pixel PX1 and the second pixel PX2 during a first horizontal period T1 in the first sub-field period SF1 will be described with reference to FIGS. 8 and 9A.

The first gate signal GS1 has the high state during the first horizontal period T1 in the first sub-field period SF1. The first gate signal GS1 in the high state is applied to the first gate line GL1. Accordingly, the first pixel transistor TFT1 receiving the first gate signal GS1 through the first gate line GL1 and the gate electrode GE1 is turned on, and the second pixel transistor TFT2 receiving the first gate signal GS1 through the first gate line GL1 and the gate electrode GE2 is turned on.

In addition, during the first horizontal period T1 in the first sub-field period SF1, the first red image data signal Rd1 is applied to the first data line DL1 and the second red image data signal Rd2 is applied to the second data line DL2. Accordingly, the first red image data signal Rd1 applied from the first data line DL1 is applied to the first pixel electrode PE1 through the turned-on first pixel transistor TFT1, and the second red image data signal Rd2 applied from the second data line DL2 is applied to the second pixel electrode PE2 through the turned-on second pixel transistor TFT2.

Accordingly, an electric field is generated between the first pixel electrode PE1 applied with the first red image data signal Rd1 and the common electrode 185, and due to the electric field, the liquid crystal molecules LC1 included in the liquid crystal layer 155 between the first pixel electrode PE1 and the common electrode 185 are rotated. In an exemplary embodiment, the liquid crystal layer 155 may include liquid crystal molecules that have negative dielectric anisotropy and are aligned homeotropically, and in this case, the liquid crystal molecules may be rotated due to the electric field and may have a major axis tilted by a predetermined angle with respect to the surface of the substrate, for example. Hereinafter, the liquid crystal layer 155 is to be understood to include liquid crystal molecules having negative dielectric anisotropy and aligned homeotropically, for example.

An electric field is generated between the second pixel electrode PE2 applied with the second red image data signal Rd2 and the common electrode 185, and due to the electric field, the liquid crystal molecules LC2 included in the liquid crystal layer 155 between the second pixel electrode PE2 and the common electrode 185 are rotated. In an exemplary embodiment, the liquid crystal molecules LC2 of the liquid crystal layer 155 may be rotated due to the electric field and may have a major axis tilted by a predetermined angle with respect to the surface of the substrate, for example.

Further, during the aforementioned first horizontal period T1 in the first sub-field period SF1, the first light source driving signal LS1 in the high state is applied to the first light source 821 and the second light source driving signal LS2 in the low state is applied to the second light source 822. Accordingly, the first light source 821 maintains a turned-on state, and the second light source 822 maintains a turned-off state, during the first horizontal period T1. In other word, during the first horizontal period T1, the first light source 821 emits the first light (hereinafter, "red light R"), while the second light source 822 does not emit the second light (hereinafter, "blue light B"). The red light R emitted from the first light source 821 is linearly polarized through the lower polarizer 121. That is, the red light R is polarized along the transmission axis of the lower polarizer 121. Further, the red light R, which is linearly polarized, is incident to the entire portion of the liquid crystal layer 155 including the liquid crystal layer 155 of the first pixel PX1 and the liquid crystal layer 155 of the second pixel PX2.

The red light R, linearly polarized, being incident to the liquid crystal layer 155 of the first pixel PX1 is elliptically polarized while being transmitted through the liquid crystal layer 155. This is because the liquid crystal molecules LC1 included in the liquid crystal layer 155 of the first pixel PX1 have a major axis aligned parallel to the surface of the substrate. The red light R, which is elliptically polarized, is incident to the upper polarizer 122. As being an elliptically polarized light, the red light R incident to the upper polarizer 122 may be transmitted through the upper polarizer 122. Accordingly, the red light R, which is elliptically polarized, may be incident to the wavelength conversion layer 195 through the upper polarizer 122. Since the wavelength of the red light R is not in a wavelength range that may be converted by the wavelength conversion layer 195, the wavelength conversion layer 195 transmits the red light R, which is elliptically polarized, to be emitted externally as it is. In this case, the red light R is externally emitted from the wavelength conversion layer 195 through the upper substrate 162. Accordingly, the first pixel PX1 emits the red light R during the first horizontal period T1 in the first sub-field period SF1.

The red light R, linearly polarized, being incident to the liquid crystal layer 155 of the second pixel PX2 is elliptically polarized while being transmitted through the liquid crystal layer 155. This is because the liquid crystal molecules LC2 included in the liquid crystal layer 155 of the second pixel PX2 have a major axis aligned parallel to the surface of the substrate. The red light R, which is elliptically polarized, is incident to the upper polarizer 122. As being an elliptically polarized light, the red light R incident to the upper polarizer 122 may be transmitted through the upper polarizer 122. Accordingly, the red light R, which is ellip- tically polarized, may be incident to the light transmission layer 198 through the upper polarizer 122. The light transmission layer 198 transmits the red light R, which is elliptically polarized, to be emitted externally as it is. In this case, the red light R is externally emitted from the light transmission layer 198 through the upper substrate 162. Accordingly, the second pixel PX2 emits the red light R during the first horizontal period T1 in the first sub-field period SF1.

As described in the foregoing, each of the first pixel PX1 and the second pixel PX2 is operated in a light transmission mode, during the first horizontal period T1 in the first sub-field period SF1. Accordingly, the first pixel PX1 displays a red image by emitting the red light R based on the first red image data signal Rd1 and the second pixel PX2 displays a red image by emitting the red light R based on the second red image data signal Rd2, during the first horizontal period T1 in the first sub-field period SF1. As a result, the unit pixel UPX (refer to FIG. 3A) including the first pixel PX1 and the second pixel PX2 emits the red light R during the first horizontal period T1 in the first sub-field period SF1. In other words, the unit pixel UPX displays a red image during the first horizontal period T1 in the first sub-field period SF1.

During each horizontal period in the first sub-field period SF1, the first pixel PX1 and the second pixel PX2 may be operated in the same manner as the first pixel PX1 and the second pixel PX2 are operated during the first horizontal period T1 in the first sub-field period SF1. Accordingly, the unit pixels UPX each display a red image in the first sub-field period SF1.

In another exemplary embodiment, the black image data signal BK, in lieu of the second red image data signal Rd2, may be applied to the second pixel PX2 during the first horizontal period T1 in the first sub-field period SF1. That is, the second pixel PX2 may be operated in the light blocking mode during the first horizontal period T1 in the first sub-field period SF1. In this case, the second pixel PX2 does not emit any light during the first horizontal period T1.

Hereinafter, a driving operation of the first pixel PX1 and the second pixel PX2 during a second horizontal period T2 in the second sub-field period SF2 will be described with reference to FIGS. 8 and 9B.

The first gate signal GS1 has the high state during the second horizontal period T2 in the second sub-field period SF2. The first gate signal GS1 in the high state is applied to the first gate line GL1. Accordingly, the first pixel transistor TFT1 receiving the first gate signal GS1 through the first gate line GL1 and the gate electrode GE1 is turned on, and the second pixel transistor TFT2 receiving the first gate signal GS1 through the first gate line GL1 and the gate electrode GE2 is turned on.

In addition, during the second horizontal period T2 in the second sub-field period SF2, the green image data signal Gd is applied to the first data line DL1 and the blue image data signal Bd is applied to the second data line DL2. Accordingly, the green image data signal Gd applied from the first data line DL1 is applied to the first pixel electrode PE1 through the turned-on first pixel transistor TFT1, and the blue image data signal Bd applied from the second data line DL2 is applied to the second pixel electrode PE2 through the turned-on second pixel transistor TFT2.

Accordingly, an electric field is generated between the first pixel electrode PE1 applied with the green image data signal Gd and the common electrode 185, and due to the electric field, liquid crystal molecules LC1 included in the liquid crystal layer 155 between the first pixel electrode PE1 and the common electrode 185 are rotated. Accordingly, the liquid crystal molecules LC1 may be rotated due to the electric field and may have a major axis tilted by a predetermined angle with respect to the surface of the substrate.

An electric field is generated between the second pixel electrode PE2 applied with the blue image data signal Bd and the common electrode 185, and due to the electric field, the liquid crystal molecules LC2 included in the liquid crystal layer 155 between the second pixel electrode PE2 and the common electrode 185 are rotated. In an exemplary embodiment, the liquid crystal molecules LC2 may be rotated due to the electric field and may have a major axis tilted by a predetermined angle with respect to the surface of the substrate, for example.

Further, during the aforementioned second horizontal period T2 in the second sub-field period SF2, the first light source driving signal LS1 in the low state is applied to the first light source 821 and the second light source driving signal LS2 in the high state is applied to the second light source 822. Accordingly, the first light source 821 maintains a turned-off state, and the second light source 822 maintains a turned-on state, during the second horizontal period T2. In other word, during the second horizontal period T2, the first light source 821 does not emit the red light R, while the second light source 822 emits the blue light B. The blue light B emitted from the second light source 822 is linearly polarized through the lower polarizer 121. That is, the blue light B is polarized along the transmission axis of the lower polarizer 121. Further, the blue light B, which is linearly polarized, is incident to the entire portion of the liquid crystal layer 155 including the liquid crystal layer 155 of the first pixel PX1 and the liquid crystal layer 155 of the second pixel PX2.

The blue light B, linearly polarized, being incident to the liquid crystal layer 155 of the first pixel PX1 is elliptically polarized while being transmitted through the liquid crystal layer 155, and the blue light B, which is elliptically polarized, is incident to the upper polarizer 122. As being an elliptically polarized light, the blue light B incident to the upper polarizer 122 may be transmitted through the upper polarizer 122. Accordingly, the blue light B, which is elliptically polarized, may be incident to the wavelength conversion layer 195 through the upper polarizer 122. Since the wavelength of the blue light B is in the wavelength range that may be converted by the wavelength conversion layer 195, the wavelength conversion layer 195 converts the wavelength of the blue light B, which is elliptically polarized. In an exemplary embodiment, the wavelength conversion layer 195 may convert the blue light B into a third light (hereinafter, "green light G") having a wavelength longer than the wavelength of the blue light B and shorter than the wavelength of the red light R to thereby emit the green light G, for example. In this case, the green light G is externally emitted from the wavelength conversion layer 195 through the upper substrate 162. Accordingly, the first pixel PX1 emits the green light G during the second horizontal period T2 in the second sub-field period SF2.

The blue light B, linearly polarized, being incident to the liquid crystal layer 155 of the second pixel PX2 is elliptically polarized while being transmitted through the liquid crystal layer 155, and the blue light B, which is elliptically polarized, is incident to the upper polarizer 122. As being an elliptically polarized light, the blue light B incident to the upper polarizer 122 may be transmitted through the upper polarizer 122. Accordingly, the blue light B, which is elliptically polarized, is incident to the light transmission layer 198 through the upper polarizer 122. The light transmission layer 198 transmits the blue light B, which is elliptically polarized, as it is and externally emits the blue light B. In this case, the blue light B is externally emitted from the light transmission layer 198 through the upper substrate 162. Accordingly, the second pixel PX2 emits the blue light B during the second horizontal period T2 in the second sub-field period SF2.

As described in the foregoing, each of the first pixel PX1 and the second pixel PX2 is operated in a light transmission mode, during the second horizontal period T2 in the first sub-field period SF2. Accordingly, the first pixel PX1 displays a green image by emitting the green light G based on the green image data signal Gd and the second pixel PX2 displays a blue image by emitting the blue light B based on the blue image data signal Bd, during the second horizontal period T2 in the second sub-field period SF2. As a result, the unit pixel UPX including the first pixel PX1 and the second pixel PX2 emits the green light G and the blue light B together during the second horizontal period T2 in the second sub-field period SF2. In other words, the unit pixel UPX displays a green image and a blue image during the second horizontal period T2 in the second sub-field period SF2.

During each horizontal period in the second sub-field period SF2, the first pixel PX1 and the second pixel PX2 may be operated in the same manner as the first pixel PX1 and the second pixel PX2 are operated during the second horizontal period T2 in the second sub-field period SF2. Accordingly, the unit pixels UPX each display the green image and the blue image in the second sub-field period SF2.

Accordingly, the red image in the first sub-field period SF1 and the green image and the blue image in the second sub-field period SF2 are sequentially displayed in the single field period F, and thereby an image corresponding to the single field may be displayed.

Figure 9A:
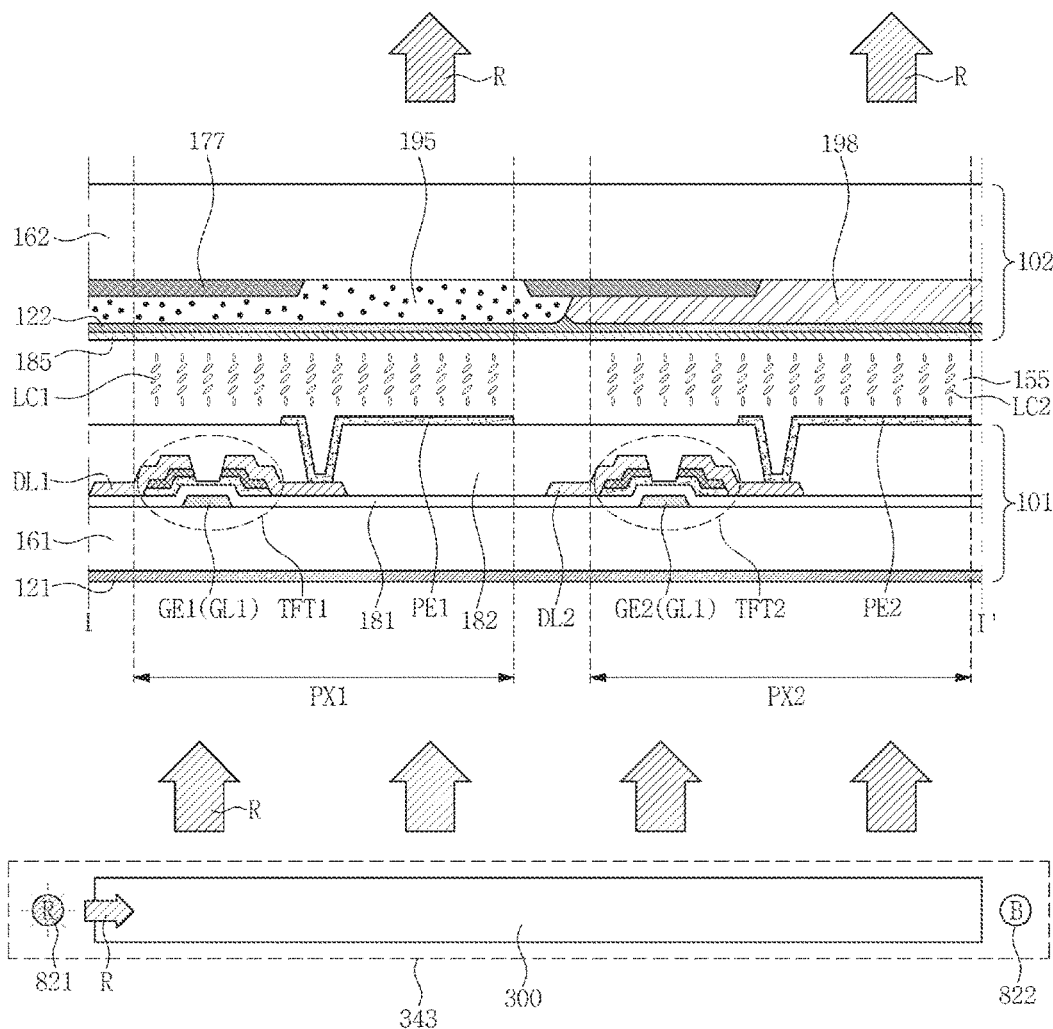
FIGS. 9A and 9B are views illustrating a driving operation of a display device receiving signals of FIG. 8.
Figure 9B:
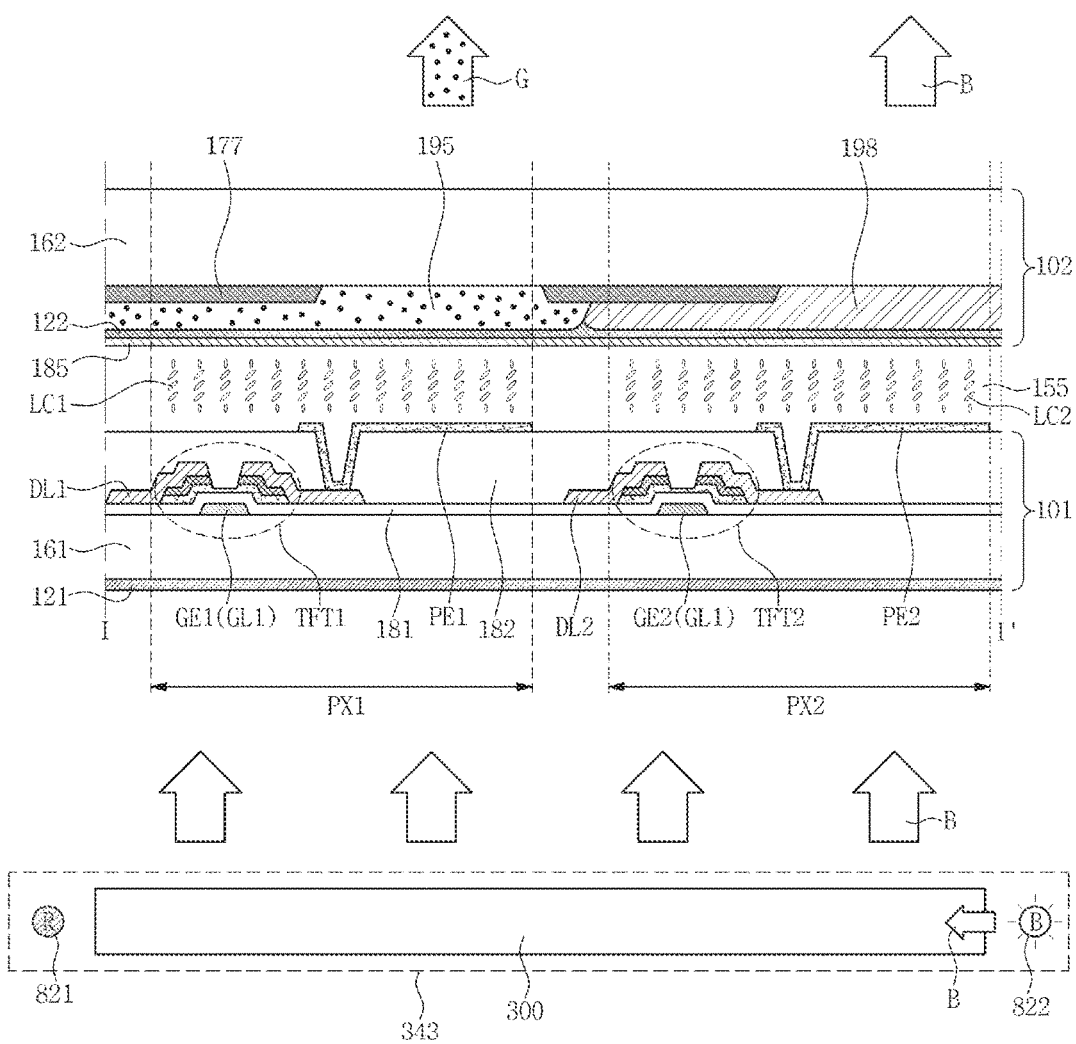

With regard to FIGS. 8, 9A, and 9B, the order of the first and second sub-field periods SF1 and SF2 commencing the operation in the single field period F may be modified differently. In an exemplary embodiment, the operation corresponding to the second sub-field period SF2 may be performed firstly, and the operation corresponding to the first sub-field period SF1 may be performed subsequently, for example. The aforementioned example is given by way of example, and the order of the first and second sub-field periods SF1 and SF2 is susceptible to various modifications. Further, the order of the first and second sub-field periods SF1 and SF2 commencing the operation in a single frame period may differ from the order of the first and second sub-field periods SF1 and SF2 commencing the operation in another frame period. In an exemplary embodiment, while the operation corresponding to the first sub-field period SF1 is performed firstly and the operation corresponding to the second sub-field period SF2 is performed subsequently in the first frame period, the operation corresponding to the second sub-field period SF2 may be performed firstly and the operation corresponding to the first sub-field period SF1 may be performed subsequently in the second frame period, for example.

The display device according to the invention may display a single unit image during four sub-field periods, which will be described in detail with reference to FIGS. 10, 11A, 11B, 11C, and 11D.

Figure 10:
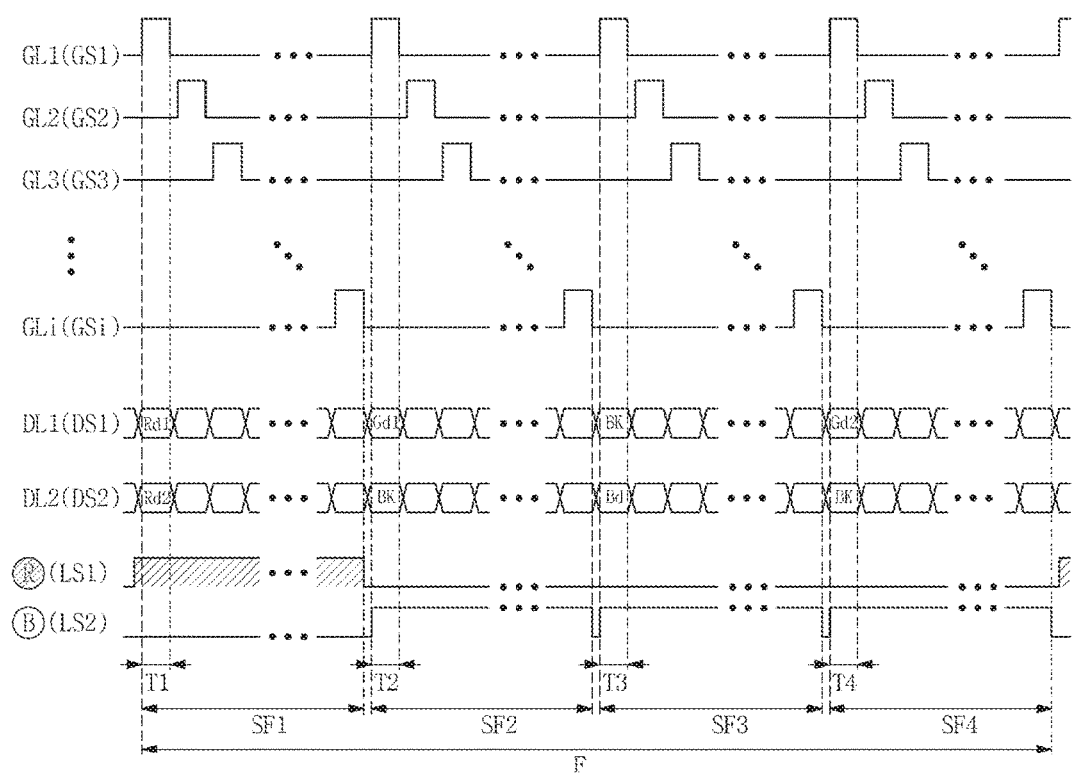
FIG. 10 is yet another timing diagram illustrating gate signals, image data signals, and light source driving signals generated in a single field period.

FIG. 10 is yet another timing diagram illustrating gate signals, image data signals, and light source driving signals generated in a single field period. FIGS. 11A to 11D are views illustrating a driving operation of the display device receiving signals of FIG. 10.

The display device according to an exemplary embodiment sequentially displays a red image, a green image, and a blue image in a single field period F, that is, a single frame period. That is, the display device according to the invention displays an image in an FSC manner. The single field period F, as illustrated in FIG. 10, may include four sub-field periods SF1, SF2, SF3, and SF4. In this case, first to $i^{th}$ gate signals GS1 to GSi are sequentially generated in each field period. The first to $i^{th}$ gate signals GS1 to GSi are sequentially applied to the first to $i^{th}$ gate lines GL1 to GLi. In an exemplary embodiment, the first to $i^{th}$ gate signals GS1 to GSi are generated sequentially from the first gate signal GS1 in the first sub-field period SF1, the first to $i^{th}$ gate signals GS1 to GSi are generated again sequentially from the first gate signal GS1 in the second sub-field period SF2, the first to $i^{th}$ gate signals GS1 to GSi are generated again sequentially from the first gate signal GS1 in the third sub-field period SF3, and subsequently, the first to $i^{th}$ gate signals GS1 to GSi are generated again sequentially from the first gate signal GS1 in the fourth sub-field period SF4, for example. Although not illustrated, a blank period may further be included between adjacent sub-field periods.

The first light source 821 is turned on in the first sub-field period SF1 and is turned off in the second, third, and fourth sub-field periods SF2, SF3, and SF4. The second light source 822 is turned on in the second, third, and fourth sub-field periods SF2, SF3, and SF4 and is turned off in the first sub-field period SF1. To this end, the first light source driving signal LS1 applied to the first light source 821 maintains the high state during the first sub-field period SF1 and maintains the low state during the second, third, and fourth sub-field periods SF2, SF3, and SF4. The second light source driving signal LS2 applied to the second light source 822 maintains the high state during the second, third, and fourth sub-field periods SF2, SF3, and SF4 and maintains the low state during the first sub-field period SF1. Herein, it is assumed that the first light source 821 emits the first light having a wavelength corresponding to the red light R, and the second light source 822 emits the second light having a wavelength corresponding to the blue light B.

FIG. 10 illustrates the first image data signal DS1 applied to the first data line DL1 and the second image data signal DS2 applied to the second data line DL2. The first image data signal DS1 includes a first red image data signal Rd1, a first green image data signal Gd1, a black image data signal BK, and a second green image data signal Gd2. The second image data signal DS2 includes a second red image data signal Rd2, a black image data signal BK, and a blue image data signal Bd. Herein, the first red image data signal Rd1, the second red image data signal Rd2, the first green image data signal Gd1, the second green image data signal Gd2, and the blue image data signal Bd are a voltage signal having a voltage level greater than or less than the voltage level of the common voltage applied to the common electrode 185, and the black image data signal BK is a voltage signal having a voltage level substantially the same as the voltage level of the common voltage.

In an exemplary embodiment, the single field period F illustrated in FIG. 10 may be driven at a speed of, for example, about 240 Hz. In this case, the first sub-field period may be driven at a speed of A Hz, the second sub-field period may be driven at a speed of B Hz, the third sub-field period may be driven at a speed of C Hz, and the fourth sub-field period may be driven at a speed of D Hz, and in this case "A+B+C+D" may be about 240 Hz. In an exemplary embodiment, A, B, C, and D may each be about 60 Hz, for example.

Hereinafter, a driving operation of the first pixel PX1 and the second pixel PX2 during a first horizontal period T1 in the first sub-field period SF1 will be described with reference to FIGS. 10 and 11A.

Figure 11A:
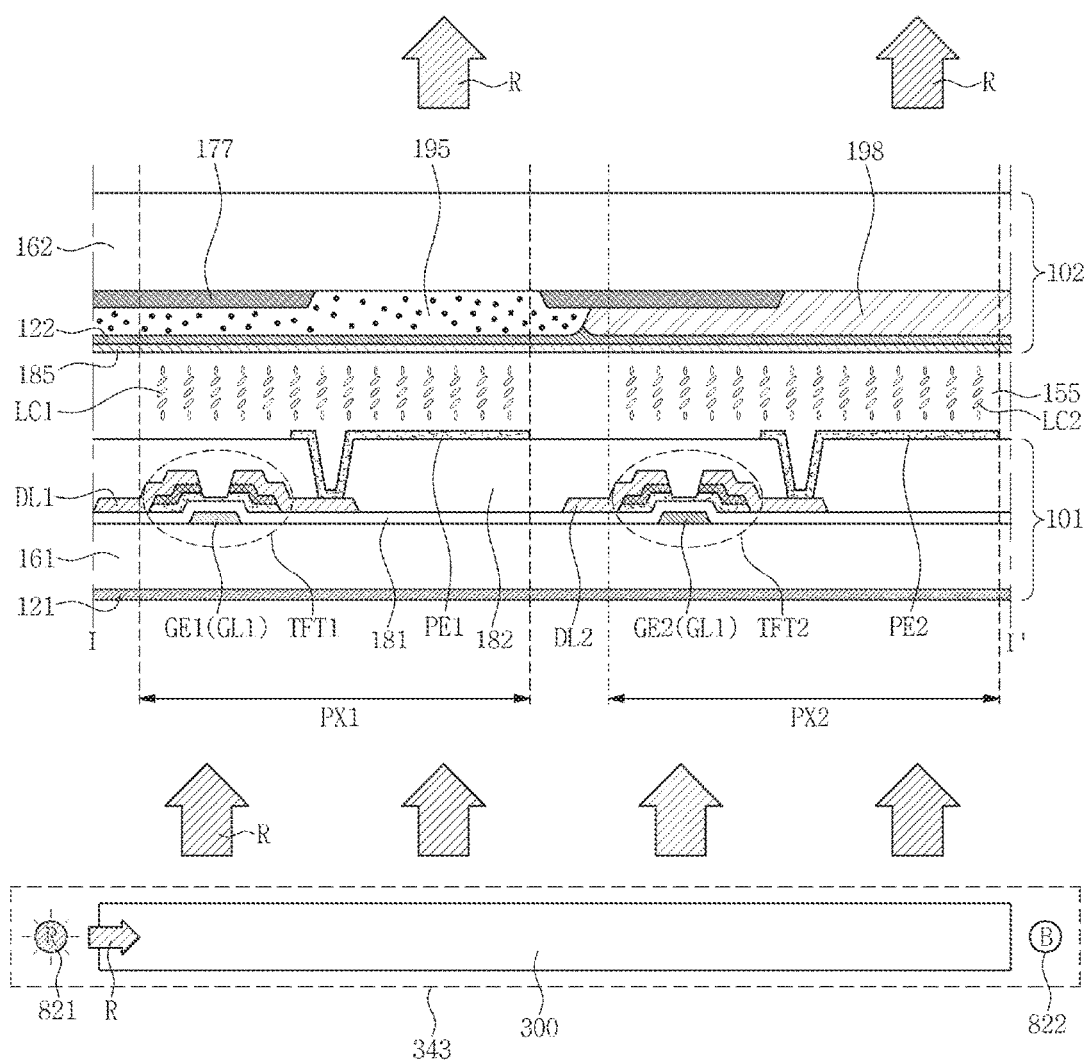
FIGS. 11A to 11D are views illustrating a driving operation of a display device receiving signals of FIG. 10.

Herein, since the driving operation of the first pixel PX1 and the second pixel PX2 with respect to the first horizontal period T1 in the first sub-field period SF1 illustrated in FIGS. 10 and 11A is substantially the same as the driving operation of the first pixel PX1 and the second pixel PX2 with respect to the first horizontal period T1 in the first sub-field period SF1 illustrated in FIGS. 8 and 9A, the driving operation of the first pixel PX1 and the second pixel PX2 with respect to the first horizontal period T1 in the first sub-field period SF1 illustrated in FIGS. 10 and 11A will make reference to FIGS. 8 and 9A and related description.

Hereinafter, a driving operation of the first pixel PX1 and the second pixel PX2 during a second horizontal period T2 in the second sub-field period SF2 will be described with reference to FIGS. 10 and 11B.

Figure 11B:
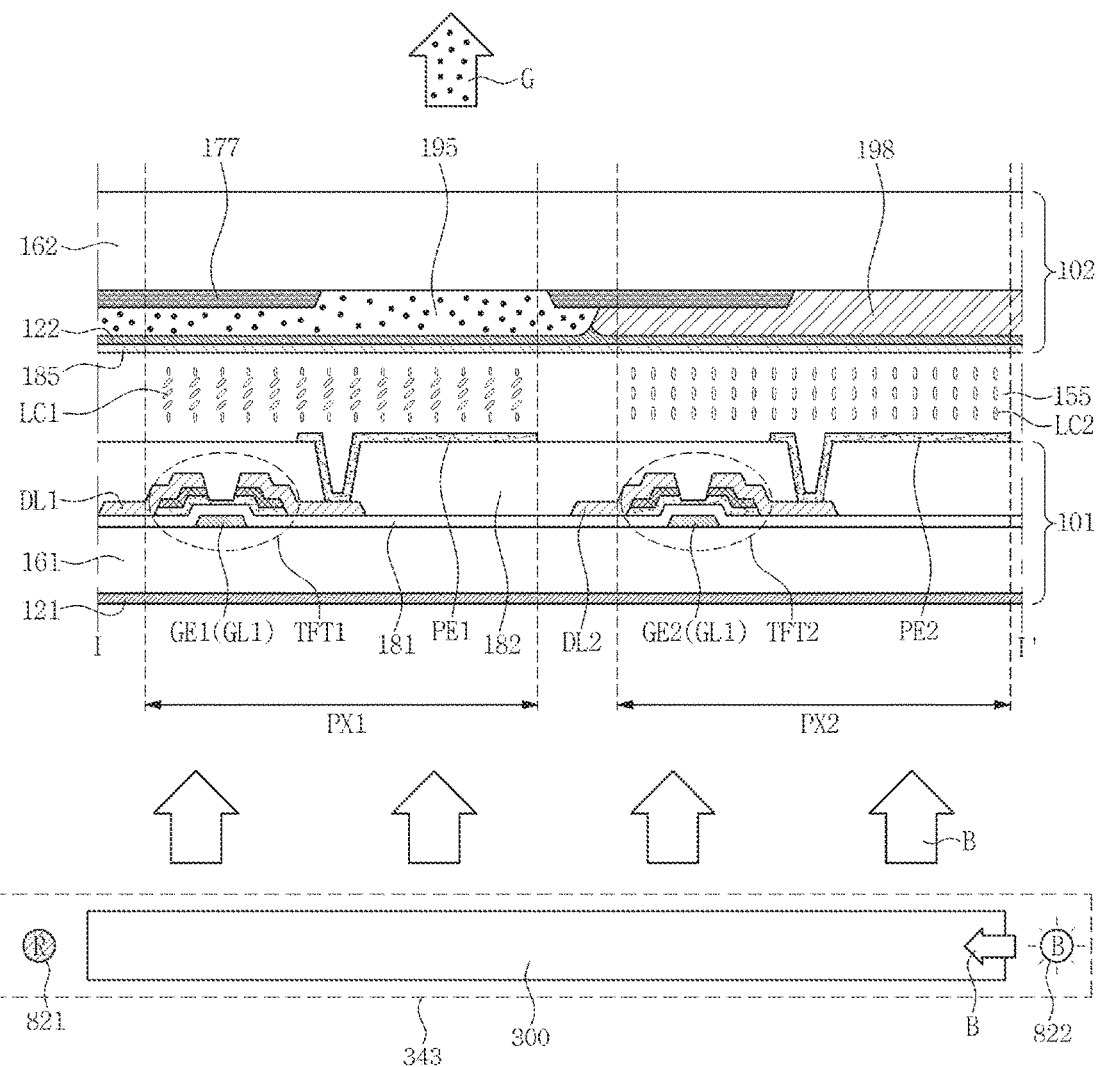

Herein, since the driving operation of the first pixel PX1 and the second pixel PX2 with respect to the second horizontal period T2 in the second sub-field period SF2 illustrated in FIGS. 10 and 11B is substantially the same as the driving operation of the first pixel PX1 and the second pixel PX2 with respect to the second horizontal period T2 in the second sub-field period SF2 illustrated in FIGS. 6 and 7B, the driving operation of the first pixel PX1 and the second pixel PX2 with respect to the second horizontal period T2 in the second sub-field period SF2 illustrated in FIGS. 10 and 11B will make reference to FIGS. 6 and 7B and related description.

Hereinafter, a driving operation of the first pixel PX1 and the second pixel PX2 during a third horizontal period T3 in the third sub-field period SF3 will be described with reference to FIGS. 10 and 11C.

Figure 11C:
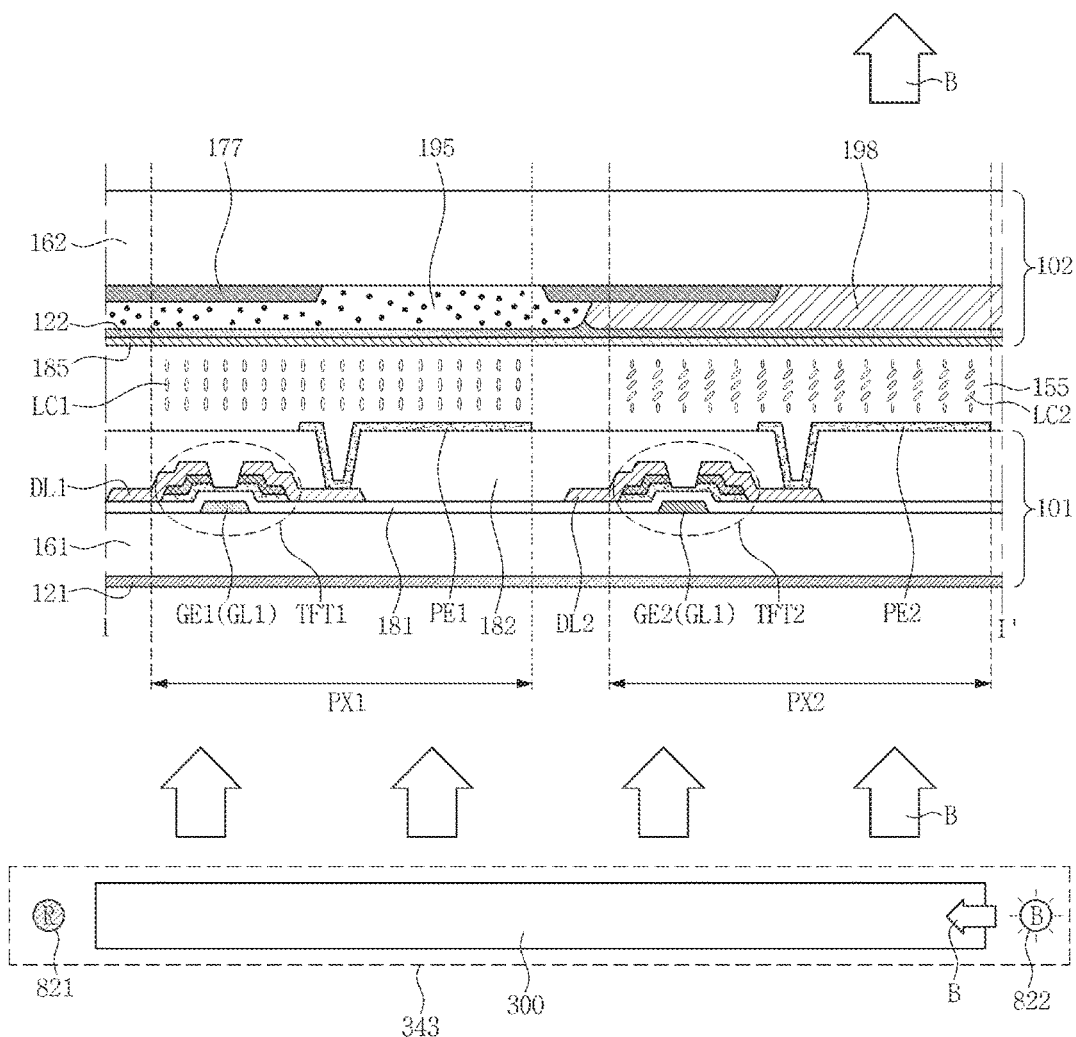

Herein, since the driving operation of the first pixel PX1 and the second pixel PX2 with respect to the third horizontal period T3 in the third sub-field period SF3 illustrated in FIGS. 10 and 11C is substantially the same as the driving operation of the first pixel PX1 and the second pixel PX2 with respect to the third horizontal period T3 in the third sub-field period SF3 illustrated in FIGS. 6 and 7C, the driving operation of the first pixel PX1 and the second pixel PX2 with respect to the third horizontal period T3 in the third sub-field period SF3 illustrated in FIGS. 10 and 11C will make reference to FIGS. 6 and 7C and related description.

Hereinafter, a driving operation of the first pixel PX1 and the second pixel PX2 during a fourth horizontal period T4 in the fourth sub-field period SF4 will be described with reference to FIGS. 10 and 11D.

Figure 11D:
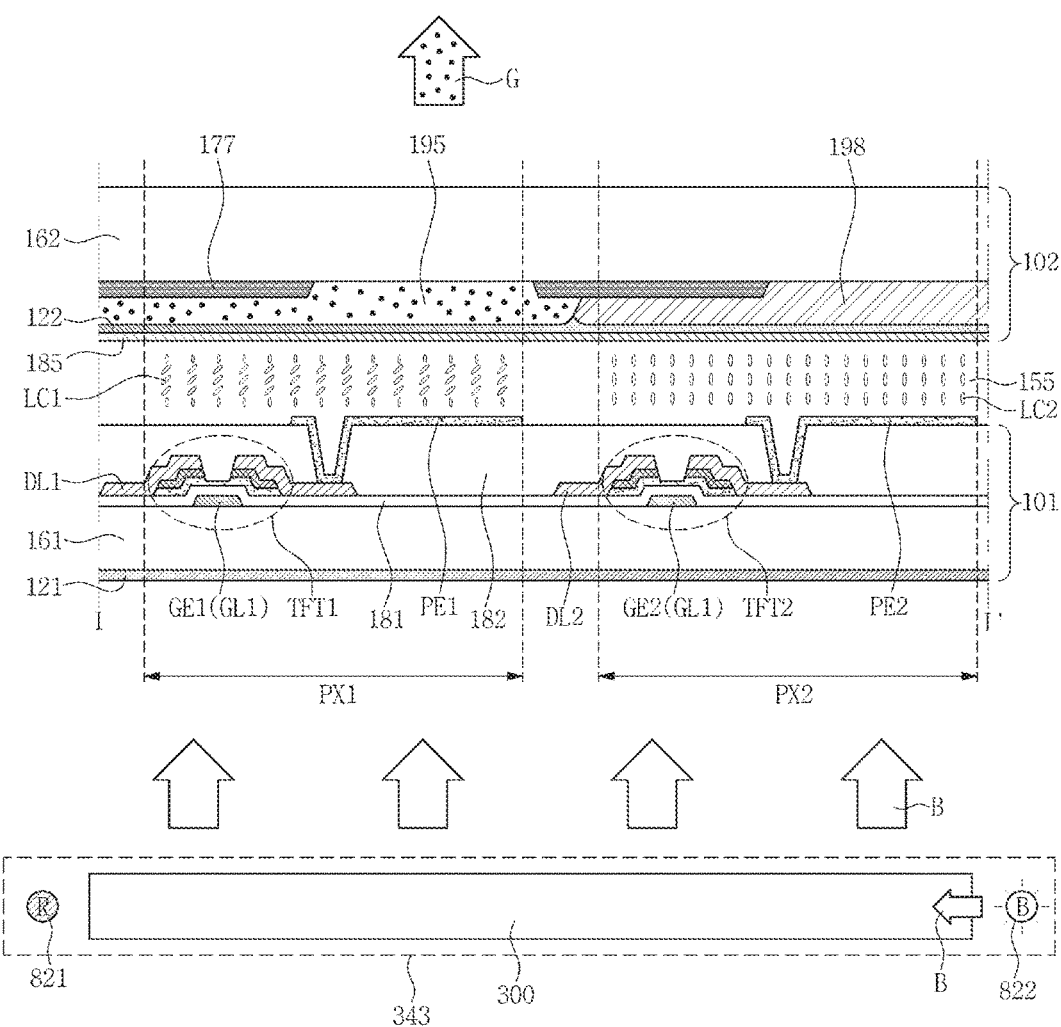

Herein, since the driving operation of the first pixel PX1 and the second pixel PX2 with respect to the fourth horizontal period T4 in the fourth sub-field period SF4 illustrated in FIGS. 10 and 11D is substantially the same as the driving operation of the first pixel PX1 and the second pixel PX2 with respect to the second horizontal period T2 in the second sub-field period SF2 illustrated in FIGS. 6 and 7B, the driving operation of the first pixel PX1 and the second pixel PX2 with respect to the fourth horizontal period T4 in the fourth sub-field period SF4 illustrated in FIGS. 10 and 11D will make reference to FIGS. 6 and 7B and related description. However, during the fourth horizontal period T4 in the fourth sub-field period SF4 illustrated in FIGS. 10 and 11D, a green image is displayed based on a second green image data signal Gd2, instead of being based on the green image data signal Gd.

The first green image data signal Gd1 may have a voltage level less than a voltage level of an original green image data signal that is desired to be displayed. Further, the second green image data signal Gd2 may have a voltage level less than a voltage level of the original green image data signal that is desired to be displayed. In this case, a total of the voltage of the first green image data signal Gd1 and the voltage of the second green image data signal Gd2 may be equal to the voltage of the original image data signal. In an exemplary embodiment, the first green image data signal Gd1 may have a voltage level which is half the voltage level of the original green image data signal, and the second green image data signal Gd2 may also have a voltage level which is half the voltage level of the original green image data signal, for example.

As the green image based on the first green image data signal Gd1 and the green image based on the second green image data signal Gd2 are combined in a single field period, a green image corresponding to the desired green image data signal may be displayed.

As described in the foregoing, as the first green image data signal Gd1 and the second green image data signal Gd2 each having a voltage level which is half the voltage level of the original green image data signal are applied in different periods, an amount of leakage light caused in the wavelength conversion layer 195 may be reduced. As used herein, the leakage light from the wavelength conversion layer 195 refers to light having the wavelength of the third light or a wavelength apart from the wavelength range of the third light. In an exemplary embodiment, in a case where the third light corresponds to the green light G, the leakage light may be a light having a color other the green color, for example. In general, as the voltage of the image data signal increases, an amount of leakage light increases. Accordingly, in a case where the plurality of green image data signals Gd1 and Gd2 having a relatively small voltage level are sequentially applied over a plurality of periods, the amount of the leakage light may be reduced, such that color reproducibility with respect to the third light may be enhanced.

In order to achieve such a driving operation, the timing controller, for example, may receive the original image data signal applied from a system and generate two or more image data signals having a voltage level less than the voltage level of the original image data signal. Herein, a total of each of the voltages of the two or more image data signals may be equal to the voltage of the original image data signal. In this case, the two or more image data signals may each have voltage levels the same as one another or may be different from one another.

Accordingly, the red image in the first sub-field period SF1, the green image in the second sub-field period SF2, the blue image in the third sub-field period SF3, and the green image in the fourth sub-field period SF4 are sequentially displayed in the single field period F, and thereby an image corresponding to the single field may be displayed.

With regard to FIGS. 10, 11A, 11B, 11C, and 11D, the order of the first, second, third, and fourth sub-field periods SF1, SF2, SF3, and SF4 commencing the operation in the single field period F may be modified differently. In an exemplary embodiment, the operation corresponding to the fourth sub-field period SF4 may be performed firstly, operation corresponding to the first sub-field period SF1 may be performed, the operation corresponding to the third sub-field period SF3 may be performed subsequently, and the operation corresponding to the second sub-field period SF2 may be performed lastly, for example. The aforementioned example is given by way of example, and the order of the first, second, third, and fourth sub-field periods SF1, SF2, SF3, and SF4 is susceptible to various modifications. Further, the order of the first, second, third, and fourth sub-field periods SF1, SF2, SF3, and SF4 commencing the operation in a single frame period may differ from the order of the first, second, third, and fourth sub-field periods SF1, SF2, SF3, and SF4 commencing the operation in another frame period. In an exemplary embodiment, while the operation corresponding to the first sub-field period SF1 is performed firstly, the operation corresponding to the second sub-field period SF2 is performed, operation corresponding to the fourth sub-field period SF4 is performed subsequently, and the operation corresponding to the third sub-field period SF3 is performed lastly in the first frame period, the operation corresponding to the second sub-field period SF2 may be performed firstly, the operation corresponding to the first sub-field period SF1 may be performed, the operation corresponding to the fourth sub-field period SF4 may be performed subsequently, and the operation corresponding to the third sub-field period SF3 may be performed lastly in the second frame period, for example.

Figure 12:
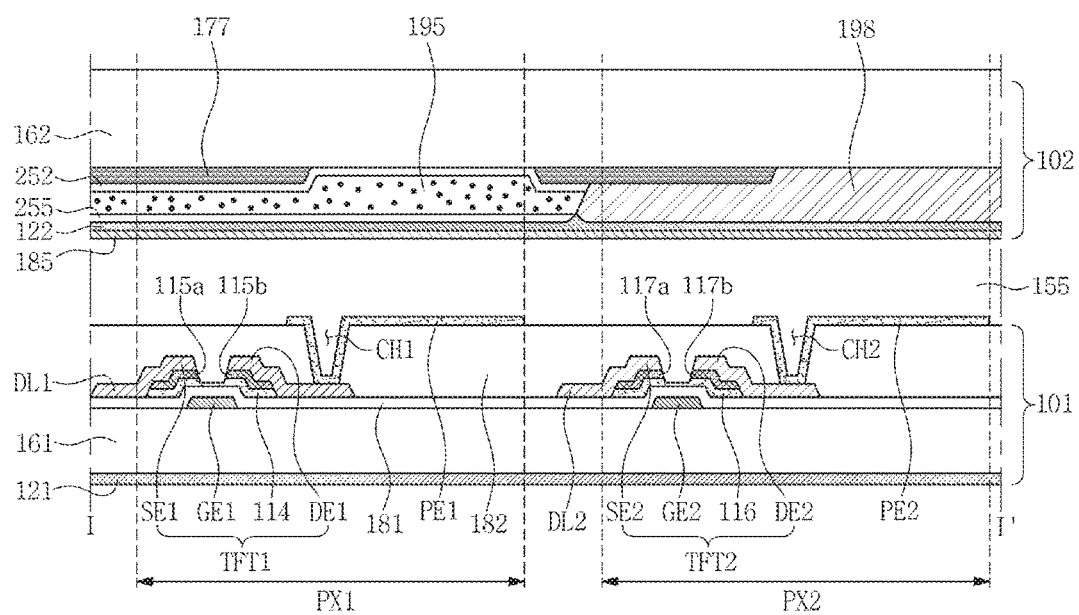
FIG. 12 is a cross-sectional view taken along line I-I' of FIG. 4.

FIG. 12 is a cross-sectional view taken along line I-I' of FIG. 4.

As illustrated in FIG. 12, the first pixel PX1 may further include at least one of a light blocking layer 252 and a light reflecting layer 255.

The light blocking layer 252 blocks the second light emitted through the wavelength conversion layer 195. The second light may be a blue light B, for example. The light blocking layer 252 blocks leakage light from the aforementioned wavelength conversion layer 195. In an exemplary embodiment, during the second horizontal period T2 in FIG. 6 and the second and fourth horizontal periods T2 and T4 in FIG. 10, the first pixel PX1 is operated in the light transmission mode, and the blue light B, in addition to the green light G, may be emitted externally from the wavelength conversion layer 195, for example. The light blocking layer 252 selectively blocks such a blue light B. The light blocking layer 252 transmits the first light and the third light, for example, the red light R and the green light G. The light blocking layer 252 may be disposed between the wavelength conversion layer 195 and the upper substrate 162. In this case, an edge portion of the light blocking layer 252 may be disposed on the light blocking layer 177.

The light reflecting layer 255 directs the third light reflected from the wavelength conversion layer 195 back toward the wavelength conversion layer 195. The light reflecting layer 255 selectively reflects only the third light. In this case, the light reflecting layer 255 does not reflect light, for example, the first light and the second light, other than the third light. In an exemplary embodiment, the light reflecting layer 255 re-reflects the third light, for example, the green light G, which is not transmitted through the wavelength conversion layer 195 and reflected, to be provided back toward the wavelength conversion layer 195. The light reflecting layer 255 may be disposed between the wavelength conversion layer 195 and the liquid crystal layer 155, for example.

Figure 13:
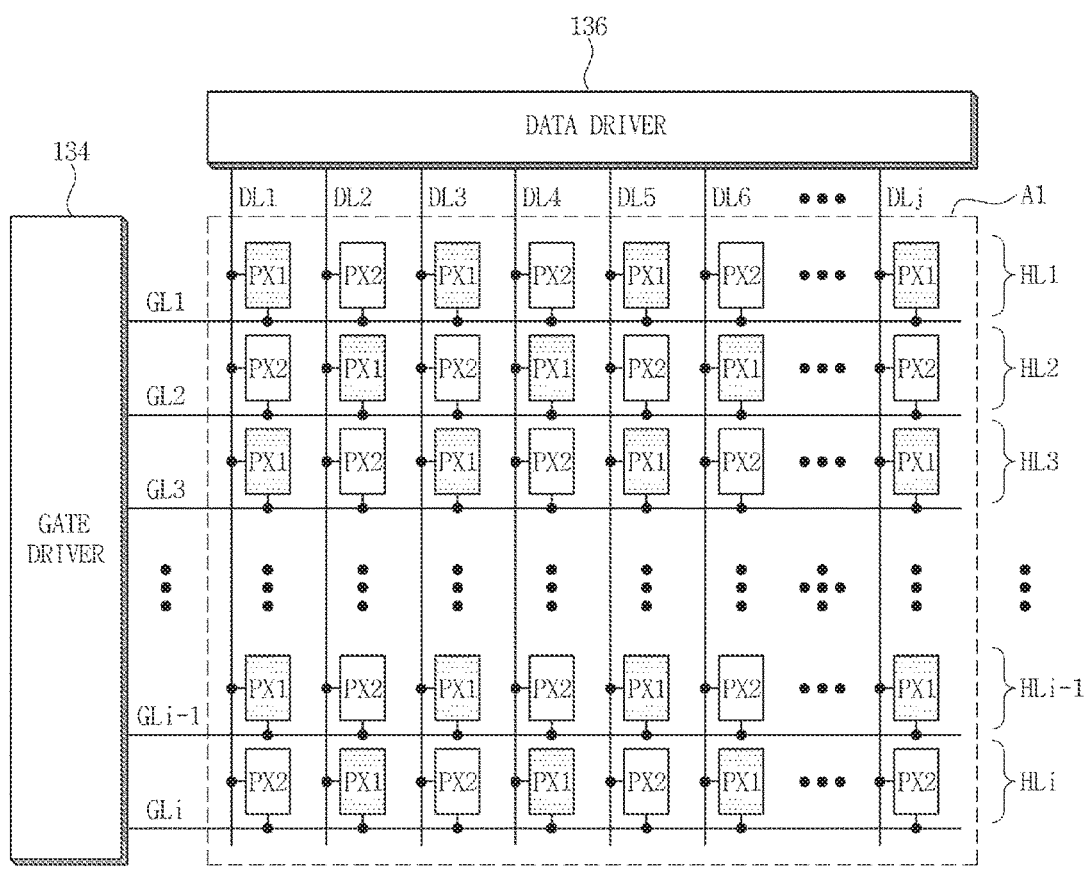
FIG. 13 is a view illustrating another arrangement of pixels disposed on the display panel of FIG. 1.

FIG. 13 is a view illustrating another arrangement of pixels disposed on the display panel of FIG. 1.

As illustrated in FIG. 13, the first pixel PX1 and the second pixel PX2 may be alternately connected to a single data line. In this case, pixels respectively connected to adjacent data lines and connected in common to a single gate line are different pixels. In an exemplary embodiment, the first pixel PX1 connected to the first data line DL1 and the first gate line GL1 differs from the second pixel PX2 connected to the second data line DL2 and the first gate line GL1, for example.

FIG. 14 is a view illustrating improvement in transmittance in the display device according to an exemplary embodiment.

When a total amount of light emitted from the backlight unit 343 (refer to FIG. 11D, for example) is defined as 100, the comparison between light transmittance of a liquid crystal display ("LCD") device in a twisted nematic ("TN") mode (hereinafter, "conventional display device") and light transmittance of the display device according to the invention will be described hereinbelow. In an exemplary embodiment, the conventional display device includes four pixels as a unit pixel, and each of the four pixels include red, green, blue, and white color filters, for example.

In the case of the conventional display device, 50% of the amount of light emitted from the backlight unit is transmitted through a lower polarizer, 64% of the amount of light transmitted through the lower polarizer is transmitted through a pixel region, 100% of the amount of light transmitted through the pixel region is transmitted through a liquid crystal layer, 31% of the amount of light transmitted through the liquid crystal layer is transmitted through a color filter, and 100% of the amount of light transmitted through the color filter is transmitted through an upper polarizer. Accordingly, the light transmittance of the conventional display device is about 10%.

In the case of the display device according to the invention, 50% of the amount of light emitted from the backlight unit 343 is transmitted through the lower polarizer 121, 76% of the amount of light transmitted through the lower polarizer 121 is transmitted through the pixel region, 80% of the amount of light transmitted through the pixel region is transmitted through the liquid crystal layer 155, 93% of the amount of light transmitted through the liquid crystal layer 155 is transmitted through a color filter, i.e., the wavelength conversion layer 195 (refer to FIG. 12, for example) and the light transmission layer 198 (refer to FIG. 12, for example), and 100% of the amount of light transmitted through the color filter, i.e., the wavelength conversion layer 195 and the light transmission layer 198 is transmitted through the upper polarizer 122 (refer to FIG. 12, for example). Accordingly, the light transmittance of the display device according to the invention is about 28%.

The pixel region is an area corresponding to the aperture of the light blocking layer 177. Since the number of pixels included in the unit pixel is relatively small in the display device according to the invention compared to the conventional display device, the display device according to the invention has an aperture greater in size than the aperture of the conventional display device.

Accordingly, the display device according to the invention may have a light transmittance about 2.9 times the light transmittance of the conventional display device.

FIG. 15 is a view illustrating improvement in color reproducibility of the display device according to an exemplary embodiment.

In FIG. 15, x and y denote coordinates of a corresponding color in commission internationale de l'Eclairage ("CIE") 1931 chromaticity diagram.

As illustrated in FIG. 15, the display device according to the invention exhibits a high color reproducibility of about 116%. In other words, the display device according to the invention may represent about 116% of the number of colors based on national television system committee ("NTSC").

As set forth hereinabove, the display device and the method of driving the display device according to the exemplary embodiments may provide the following effects.

First, the respective one of a red image, a green image, and a blue image may be displayed using only two types of pixels, such that an aperture ratio of a unit pixel may be significantly enhanced.

Second, the two types of pixels represent colors using a wavelength conversion layer and a light transmission layer without a color filter, such that light transmittance of a unit pixel increases significantly.

Third, luminance of the unit pixel may be maintained in a normal state with a relatively small amount of light, such that power consumption of the backlight unit may be reduced.

Fourth, the wavelength conversion layer includes a quantum dot or a quantum rod that have self-emission characteristics on a surface thereof, such that color reproducibility may be significantly improved in the LCD device to achieve a wide viewing angle.

Fifth, a unit pixel may be configured using only the two types of pixels, such that the display device may achieve super definition and may be advantageous in pixel rendering and local dimming.

Sixth, the display device may perform driving operation at high speed without color mixture.

Seventh, color desaturation artifact is significantly reduced, such that image degradation may be prevented.

Eighth, a manufacturing method is relatively simple.

Ninth, a red LED and a blue LED that have a relatively long life cycle, relatively stable supply and demand, and a relatively low price may be used.

Tenth, a transparent photosensitizer having relatively high device reliability is used as the light transmission layer, such that product risk may be significantly reduced.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings.

What is claimed is:

1. A display device comprising:
   a display panel comprising a first pixel and a second pixel; and
   a light source unit which provides, to the display panel, a first light and a second light having different wavelengths from each other,
   wherein the first pixel comprises a wavelength conversion layer which transmits the first light when the first pixel is turned-on and converts the second light into a third light to thereby emit the third light when the first pixel is turned-on, and
   the second pixel comprises a light transmission layer which transmits the first light and the second light when the second pixel is turned-on.

2. The display device of claim 1, wherein the third light has a wavelength between the wavelength of the first light and the wavelength of the second light.

3. The display device of claim 1, wherein the light source unit emits at least one of the first light and the second light in each predetermined period.

4. The display device of claim 3, wherein the light source unit selectively emits one of the first light and the second light and does not emit the other of the first light and the second light, in at least one period.

5. The display device of claim 4, wherein the light source unit emits the first light and the first pixel externally emits the first light through the wavelength conversion layer, in a first period;

the light source unit emits the second light, the first pixel externally emits the third light through the wavelength conversion layer, and the second pixel blocks the second light, in a second period; and the light source unit emits the second light, the first pixel blocks the second light, and the second pixel externally emits the second light through the light transmission layer, in a third period.

6. The display device of claim 5, wherein the second pixel either externally emits the first light through the light transmission layer or blocks the first light, in the first period.

7. The display device of claim 5, wherein the light source unit emits the second light, the first pixel externally emits the third light through the wavelength conversion layer, and the second pixel blocks the second light, in a fourth period.

8. The display device of claim 7, wherein a first image data signal applied to the first pixel in the first period and a second image data signal applied to the first pixel in the fourth period have a voltage less than a voltage of an original image data signal.

9. The display device of claim 8, wherein a total of the voltage of the first image data signal and the voltage of the second image data signal is the same as the voltage of the original image data signal.

10. The display device of claim 4, wherein the light source unit emits the first light and the first pixel externally emits the first light through the wavelength conversion layer, in the first period; and the light source unit emits the second light, the first pixel externally emits the third light through the wavelength conversion layer, and the second pixel externally emits the second light through the light transmission layer, in the second period.

11. The display device of claim 10, wherein the second pixel either externally emits the first light through the light transmission layer or blocks the first light, in the first period.

12. The display device of claim 1, wherein the first pixel further comprises a light shielding layer which shields the second light emitted through the wavelength conversion layer.

13. The display device of claim 1, wherein the first pixel further comprises a light reflecting layer which directs the third light reflected from the wavelength conversion layer back toward the wavelength conversion layer.

14. The display device of claim 1, wherein the wavelength conversion layer receives at least one of the first light and the second light through a light control layer of the first pixel.

15. The display device of claim 1, wherein the light transmission layer receives at least one of the first light and the second light through a light control layer of the second pixel.

16. The display device of claim 1, wherein the wavelength conversion layer comprises at least one of a quantum dot and a quantum rod.

17. The display device of claim 1, wherein the light transmission layer comprises a transparent photosensitizer.

18. The display device of claim 1, wherein the light transmission layer comprises a light scattering member.

19. The display device of claim 18, wherein the light scattering member comprises titanium dioxide ($TiO_2$).

20. The display device of claim 1, wherein the wavelength conversion layer receives the first light and emits light having a wavelength substantially the same as a wavelength of the first light.

21. The display device of claim 1, wherein the first pixel and the second pixel are adjacent to each other.

22. The display device of claim 1, wherein the first pixel and the second pixel define a unit pixel.

23. A method of driving a display device comprising: a display panel comprising a first pixel and a second pixel; and a light source unit which provides, to the display panel, a first light and a second light having different wavelengths from each other, wherein the first pixel comprises a wavelength conversion layer which transmits the first light when the first pixel is turned-on and converts the second light into a third light to thereby emit the third light when the first pixel is turned-on, and the second pixel comprises a light transmission layer which transmits the first light and the second light when the second pixel is turned-on, the method comprising:

providing the first light to the display panel and setting the first pixel to be in a light transmission mode, in a first period;

providing the second light to the display panel, setting the first pixel to be in a light transmission mode, and setting the second pixel to be in a light blocking mode, in a second period; and providing the second light to the display panel, setting the first pixel to be in the light blocking mode and setting the second pixel to be in the light transmission mode, in a third period.

24. The method of claim 23, wherein the third light has a wavelength between the wavelength of the first light and the wavelength of the second light.

25. The method of claim 23, further comprising setting the second pixel to be either in the light transmission mode or in the light blocking mode in the first period.

26. The method of claim 23, further comprising providing the second light to the display panel, setting the first pixel to be in the light transmission mode, setting the second pixel to be in the light blocking mode, in a fourth period.

27. The method of claim 26, wherein a first image data signal applied to the first pixel in the first period and a second image data signal applied to the first pixel in the fourth period have a voltage less than a voltage of an original image data signal.

28. The method of claim 27, wherein a total of the voltage of the first image data signal and the voltage of the second image data signal is the same as the voltage of the original image data signal.

29. The method of claim 23, wherein the first pixel and the second pixel are adjacent to each other.

30. The method of claim 23, wherein the first pixel and the second pixel define a unit pixel.

31. The method of claim 23, wherein the light source unit selectively emits one of the first light and the second light and does not emit the other of the first light and the second light, in at least one period.

32. A method of driving a display device comprising: a display panel comprising a first pixel and a second pixel; and a light source unit providing, to the display panel, a first light and a second light having different wavelengths from each other, wherein the first pixel comprises a wavelength conversion layer which transmits the first light when the first pixel is turned-on and converts the second light into a third light when the first pixel is turned-on to thereby emit the third light, and the second pixel comprises a light transmission layer which transmits the first light and the second light when the second pixel is turned-on, the method comprising:
provide the first light to the display panel and setting the first pixel to be in a light transmission mode, in a first period; and
providing the second light to the display panel and setting the first pixel and the second pixel to be in the light transmission mode, in a second period.

33. The method of claim 32, wherein the third light has a wavelength between the wavelength of the first light and the wavelength of the second light.

34. The method of claim 32, further comprising setting the second pixel to be either in the light transmission mode or in a light blocking mode in the first period.

35. The method of claim 32, wherein the first pixel and the second pixel are adjacent to each other.

36. The method of claim 32, wherein the first pixel and the second pixel define a unit pixel.

37. The method of claim 32, wherein the light source unit selectively emits one of the first light and the second light and does not emit the other of the first light and the second light, in at least one period.

* * * * *